United States Patent [19]
Nagami

[11] Patent Number: 5,202,668
[45] Date of Patent: Apr. 13, 1993

[54] CONTROL SYSTEM FOR A HEAD-UP DISPLAY FOR AUTOMOTIVE VEHICLES

[75] Inventor: Masafumi Nagami, Omiya, Japan
[73] Assignee: Kanto Seiki Co., Ltd., Omiya, Japan
[21] Appl. No.: 337,134
[22] Filed: Apr. 12, 1989

[30] Foreign Application Priority Data

| Apr. 12, 1988 | [JP] | Japan | 63-48262[U] |
| May 12, 1988 | [JP] | Japan | 63-61563[U] |
| May 12, 1988 | [JP] | Japan | 63-61565[U] |
| May 12, 1988 | [JP] | Japan | 63-61567[U] |
| May 12, 1988 | [JP] | Japan | 63-61568[U] |
| May 12, 1988 | [JP] | Japan | 63-61568[U] |
| May 12, 1988 | [JP] | Japan | 63-62239[U] |
| May 12, 1988 | [JP] | Japan | 63-113471[U] |
| Apr. 3, 1989 | [JP] | Japan | 1-39400[U] |
| Apr. 3, 1989 | [JP] | Japan | 1-39401[U] |

[51] Int. Cl.⁵ .......................................... G09G 3/02
[52] U.S. Cl. ................................... 340/705; 340/980; 359/630; 353/13; 353/14
[58] Field of Search .............. 340/705, 980, 767; 350/174; 353/13, 14; 358/168; 359/630

[56] References Cited

U.S. PATENT DOCUMENTS

| 4,358,713 | 11/1982 | Senoo | 315/291 |
| 4,386,345 | 5/1983 | Narveson et al. | 340/732 |
| 4,514,727 | 4/1985 | Van Antwerp | 340/793 |
| 4,868,652 | 9/1989 | Nutton | 350/174 |

FOREIGN PATENT DOCUMENTS

| 3245299 | 6/1984 | Fed. Rep. of Germany . |
| 2466046 | 9/1980 | France . |
| 63-159333 | 10/1988 | Japan . |
| WO 88/09942 | 12/1988 | World Int. Prop. O. ......... 350/174 |

OTHER PUBLICATIONS

Japanese Patent Abstract No. 59-92689, dated May 28, 1984.

Primary Examiner—Jin F. Ng
Assistant Examiner—Dov Popovici
Attorney, Agent, or Firm—Foley & Lardner

[57] ABSTRACT

A noise suppressing arrangement in the form of an interface is provided between a data transfer circuit and a driver associated with a display unit vacuum fluorescent display (VFD) tube. The driver and power supply circuits associated with the display unit feature improved arrangements which attenuate surges and spikes. The voltage appearing on the grid of the VFD is controlled by a circuit which is responsive to a signal produced by a microcomputer which controls the illumination and which induces changes in the voltages applied across the filament of the VFD. The level of illumination can be automatically controlled by light sensor and illumination levels above default values which are automatically reset to optimal values each time the system is initially energized.

19 Claims, 23 Drawing Sheets

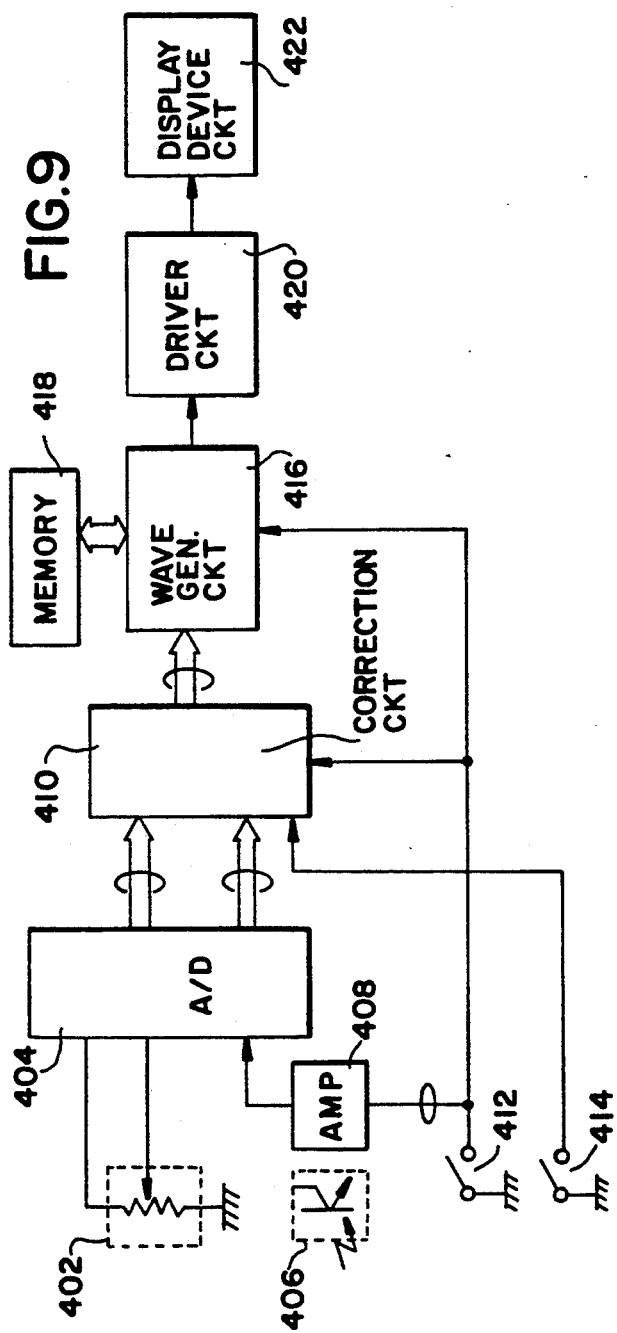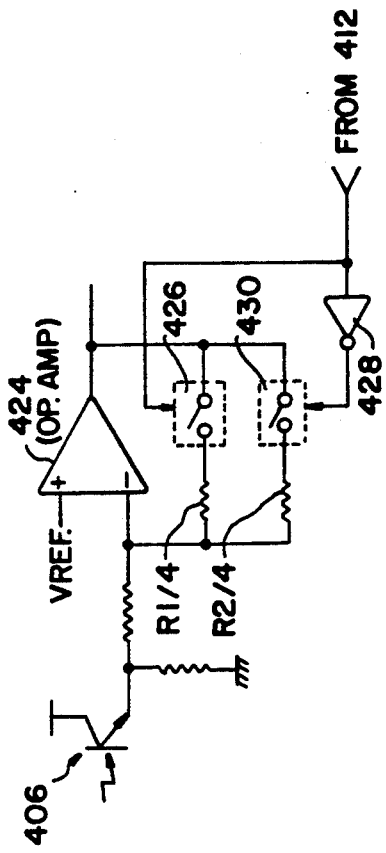

CONTROL SYSTEM FOR A HEAD-UP DISPLAY FOR AUTOMOTIVE VEHICLES

BACKGROUND OF THE INVENTION

FIG. 2 shows a previously proposed non-prior-art illumination control arrangement for use in a system of the nature shown in FIG. 1. As shown in this latter mentioned figure, a instrument panel A is arranged to house an instrument arrangement B which displays data such as the vehicle speed in two different locations at the same time. Viz., the arrangement includes a speedometer C which is located in a normal position on the instrument panel and a projection arrangement which includes a image generating unit D, and a mirror E which is arranged to reflect the image produced by the image generating unit D onto a windshield F of the vehicle in the illustrated manner. With this system it is possible for an observer (e.g. driver) to ascertain the vehicle speed by observing either the image produced on the windshield or by observing the speedometer in the conventional manner.

The control arrangement basically comprises a microcomputer 1 and first and second display units 2, 3. The microcomputer includes an interface 4 which is supplied with input signals from a light switch 5 and a manually operable up/down illumination control switch 6. The light switch 5 is arranged to be circuited in series between a battery 7 and the interface 4.

The first display unit 2 forms part of the instrument display while the second unit 3 forms part of the HUD system (head-up-display system).

The interface 4 is operatively connected with an illumination control circuit 8 which in this instance includes a memory in which wave shape data is stored, and a wave generating circuit which utilizes the stored data to produce wave shape signals and an up/down counter for recording the number of times the up and down switches are depressed.

A vehicle speed sensor 10 is arranged to input a speed indicative signal to a vehicle speed counter 12. A decoder 14 is connected with the counter 12 and arranged to convert the count data into a suitable control signal which is transferred to a speed data transmission circuit 16. As shown, the latter mentioned circuit is connected with a bus and arranged to transmit the speed indicative data to driver circuits 18, 20 included in the first and second display units. The driver circuits 18, 20 are respectively connected to a meter display unit 22 and a HUD display unit 24.

The illumination control circuit 8 is also operatively connected with the driver circuits 18 and 20 in a manner to selectively control the illumination for the same.

However, this arrangement has suffered from the drawbacks that the data which is bussed to the driver circuits 18 and 20 is apt to be influenced by noise such as high frequency radiation, short wave radio transmissions, static electricity and the like, such as tend to be generated by doppler radar systems, CB type radio communication systems and the like, and to cause the data which is displayed on the windshield and or instrument panel to undergo an undesirably deviation from that intended.

FIG. 13 shows a prior proposed vacuum fluorescent display (VFD) unit which has been utilized in the HUD and meter display units. This arrangement however has suffered from the drawbacks that appropriate illumination levels have not been adequately obtainable and therefore has hampered attempts to provide an arrangement which is both free of influence by external noise (and/or static electrical effects) and which therefore enables both accurate and clear images to be produced in the desired manner. A more detailed discussion of this arrangement will be made later in the instant disclosure in connection with a fifth embodiment of the invention.

SUMMARY OF THE INVENTION

It is an object of the present invention to provide an improved data display system which includes a HUD and which exhibits reduced susceptibility to noise and the like type of influences and which further features improved control and illumination characteristics which combine to provide a system which exhibits real utility.

In brief, the above object is achieved by an embodiment or embodiments which feature either individually or in combination arrangements wherein: a noise suppressing arrangement in the form of an interface circuit provided between a data transfer circuit and a driver associated with a display unit VFD tube. The driver and power supply circuits associated with the display unit, feature improved arrangements which attenuate surges and spikes. The voltage appearing on the grid of the VFD is controlled by a circuit which is responsive to a signal produced by microcomputer which controls the illumination and which induces changes in the voltages applied across the filament of the VFD. The level of illumination can be automatically controlled by light sensor and illumination levels above default values are automatically reset to optimal values each time the system is initially energized.

In its broadest sense the present invention is deemed to comprise a display arrangement which features: a display unit; display control means for generating signals which are supplied to the display unit and for inducing the display unit to selectively produce images; illumination control means for controlling the degree of illumination of the images produced by the display unit, the illumination control means being arranged be responsive to an input indicative of the level of external illumination in a manner to induce the selective use of first and second illumination control schedules; and noise attenuation means for attenuating the effect of noise on the images produced by the display unit.

A slightly more specific aspect of the present invention is deemed to comprise a display arrangement for use in an automotive vehicle which features: first and second display units; display control means for generating signals which are supplied to the first and second display units and for inducing the first and second display units to selectively produce images; illumination control means for controlling the degree of illumination of the images produced by the first and second display units, the illumination control means being arranged be responsive to an input indicative of the level of external illumination in a manner to induce the selective use of first and second illumination control schedules; and noise attenuation means for attenuating the effect of noise in the images produced by at least one of the first and second display units.

BRIEF DESCRIPTION OF THE DRAWINGS

FIGS. 9 to 11 show the construction and arrangement of a fourth embodiment of the present invention which features automatic illumination level control;

DETAILED DESCRIPTION OF THE PREFERRED EMBODIMENTS

Figure 3:
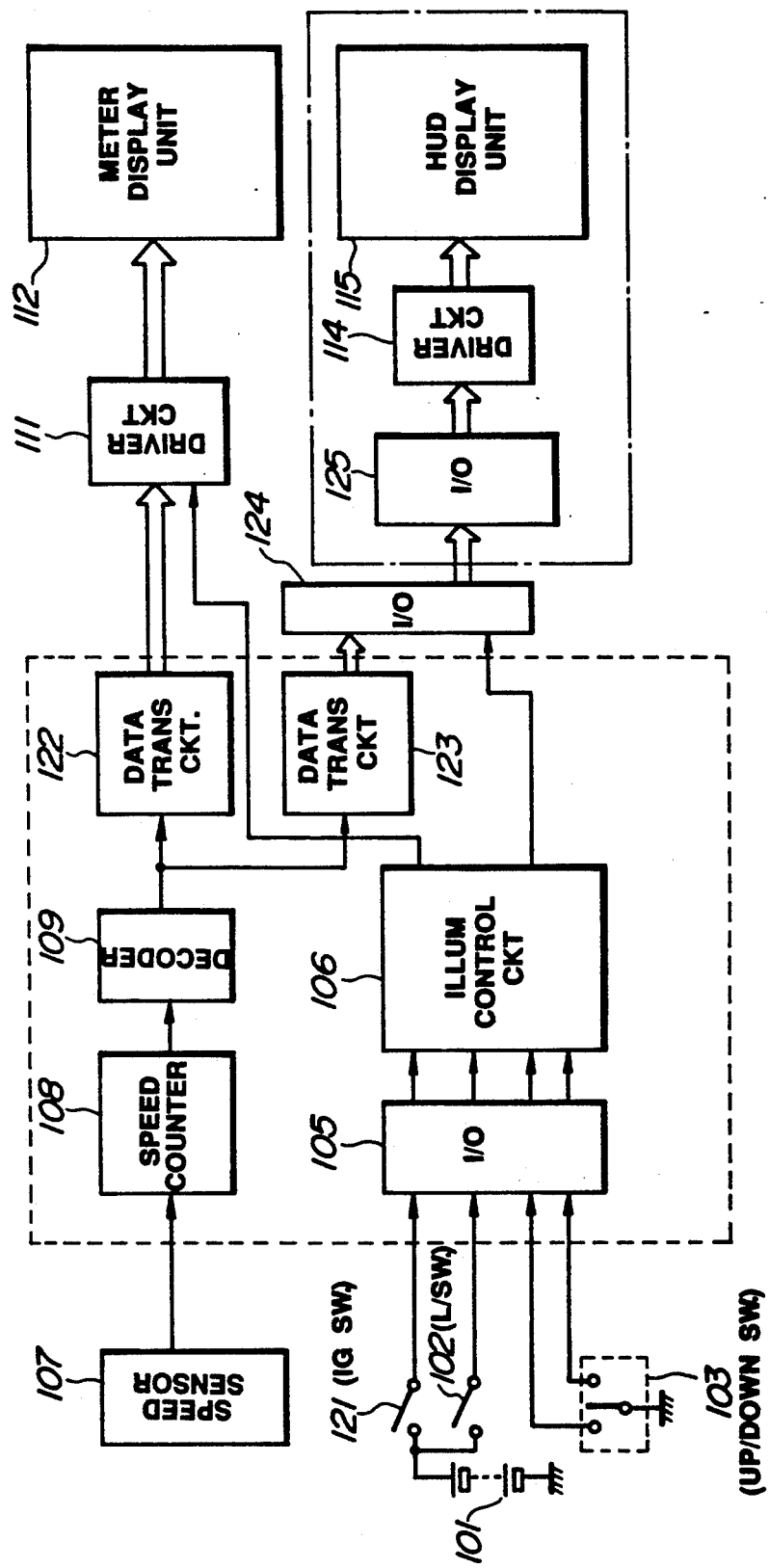
FIG. 3 shows a speed display system which includes a HUD and a meter display and which is equipped with a noise suppressing arrangement according to a first embodiment of the present invention.

Turning to FIG. 3 a first embodiment of the present invention is shown. In this arrangement the circuit is responsive to the closure of an ignition switch 121 in a manner to have predetermined optimal default day and night illumination level values automatically called from memory and installed in the illumination control circuit 106 ready for application. In this circuit 122 and 123 respectively denote data transmission circuits which are operatively connected with the dashpanel display unit 112 and the HUD 115. Numeral 124 denotes an interface circuit which is arranged to receive data from the data transmission circuit 123 and from the illumination control circuit 106. This data is then transferred to an interface 125. This interface includes a RC (resistor/capacitor) type noise filter which excludes any noise component from the display signal.

The operation of the instant embodiment is such that the speed signal which is produced by the vehicle speed sensor 107 is supplied in the form of a pulse train signal to a counter 108. The counter 108 supplies a decoder 109 with a signal which is suitably converted and subsequently supplied to both of the data transfer circuits 122 and 123.

These circuits then bus data to the meter display unit 112 via a driver circuit 111 and to the HUD display unit 115 via the interfaces 124, 125 and driver circuit 114. In this arrangement the interface 125 is especially arranged to exclude high frequency, short wave and static electrical type noise components from the data which is supplied to the driver circuit 114.

However, as the interface 125 is used as a noise filter, the data which is displayed on the HUD is the same as that which appears on the meter display unit 112.

The above disclosed circuit is such that depending on the conditioning of a light switch 102 the illumination control circuit readouts the appropriate illumination control data. When the switch 102 is open illumination data suited for daylight driving is read out. On the other hand, in the event that the light switch is closed, data suited for night driving is read out. As mentioned above, when the ignition switch is closed the system is subject to a reset which reduces any illumination values which are above predetermined default ones (one each for day and night modes) which have been previously been determined to be optimal for the given conditions. The operation of the up/down switch 103 enables the illumination values to increased or decreased as desired.

Figure 4:
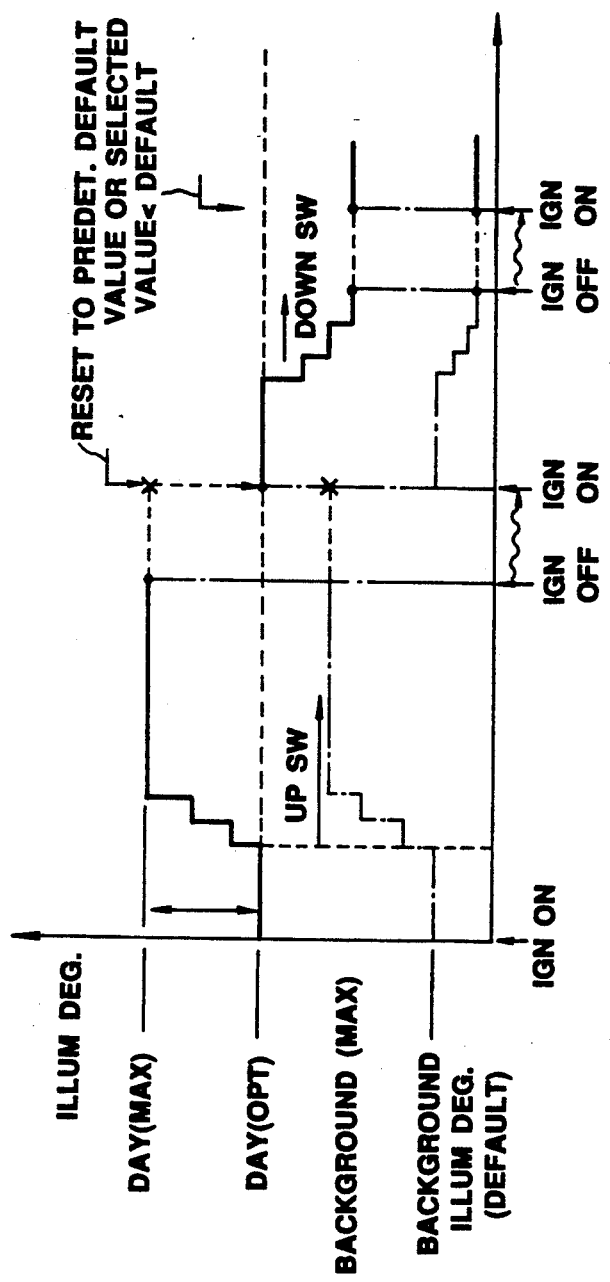
FIG. 4 is a timing chart showing the illumination control characteristics which are incorporated in the first embodiment in order to prolong the working life of the large scale VFD tubes which are utilized in the HUD and meter displays.

FIG. 4 shows in graphical form effect of the illumination degree by the ignition switch 121, and the up/down switch 103. As will be appreciated, each time the ignition switch is initially closed, levels of the image and background illuminations are, if necessary, reduced to predetermined levels.

These levels can be increased and decreased as desired, by selectively operating the up and down control switches. The manually selected levels are retained in the memory of the illumination control circuit 106.

It should be noted that in the case that the illumination levels have been reduced below the default values, these lower levels are retained and implemented upon closure of the ignition switch in place of the default values. The reason for this is that the lower illumination levels prolong the life of the VFD units, and if a driver has preferentially selected a value which is below that determined to be optimal, this or these lower values (day and night) will be given preference for this purpose.

On the other hand, if the illumination values have been manually increased, values above the default ones will be reset to the default levels for the sake of longevity even though the driver may immediately increase the same to a personally preferred level.

Although this embodiment has been disclosed as having a noise filtering arrangement associated with the HUD, it will be appreciated that such an arrangement can be alternatively included with the meter display unit or both if so desired.

SECOND EMBODIMENT

Figure 5:
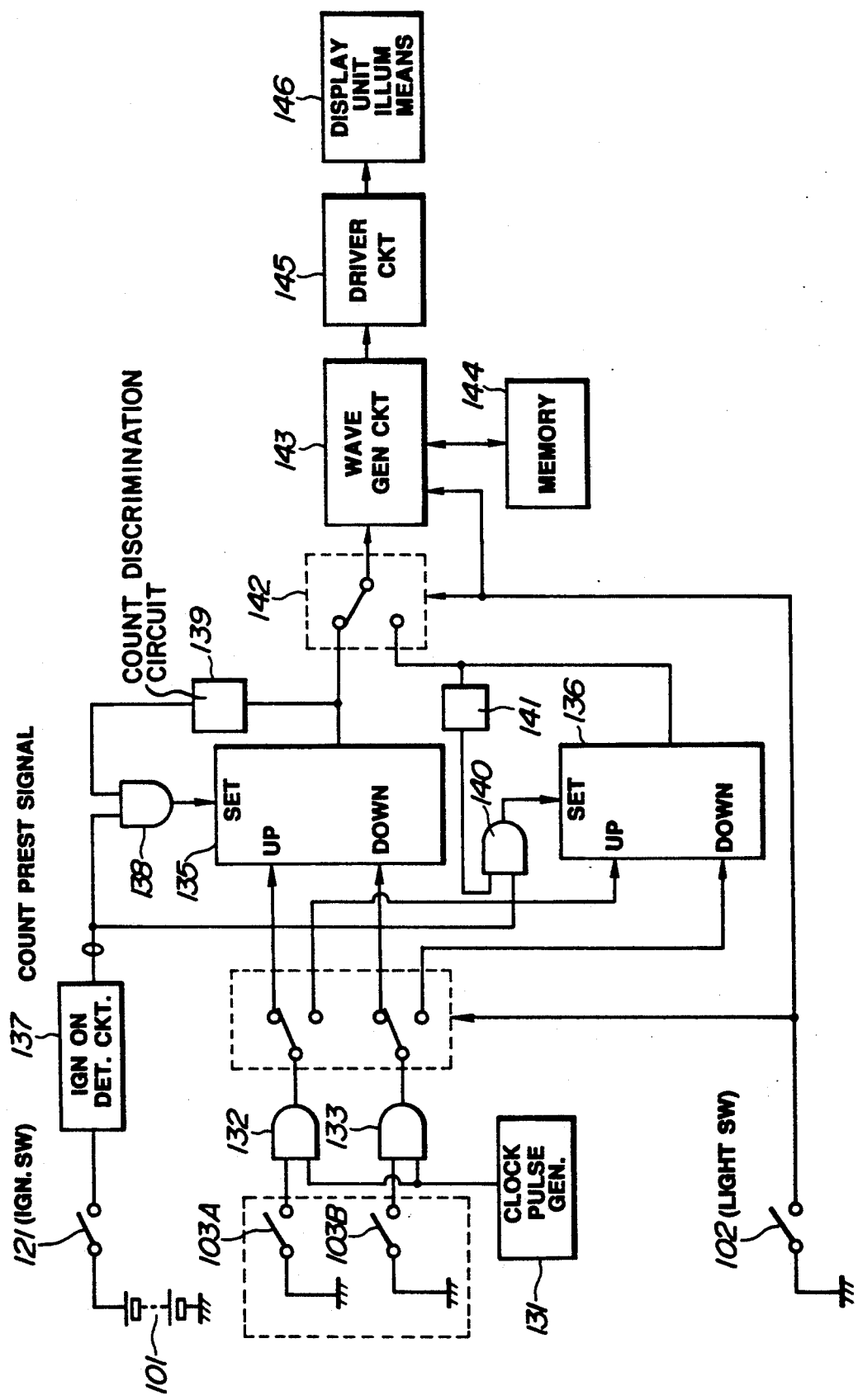
FIG. 5 is a block diagram showing the circuit arrangement which characterizes a second embodiment of the present invention.

FIG. 5 shows (in part) a second embodiment of the present invention. In this arrangement the battery 101 is circuited with an ignition "ON" status detection circuit 137 by way of the ignition switch 121. The lighting switch 102 is circuited between ground and relay circuits 134 and 142. When the lighting switch 102 is closed the movable contacts are connected with a arranged to be pivoted downward from the illustrated positions to engage the lower stationary contacts.

As will be noted, in the case of the relay circuit 134 the upper stationary contacts are connected with a first up/down counter 135 while the lower contacts are connected with a second up/down counter 136. In this arrangement the first up/down counter 135 is associated with daylight operation control which the second one 136 is associated with night operation. In this embodiment, the first up/down counter 135 is arranged to count up and down more slowly than the second one.

The movable contacts 103A and 103B of the up/down control switch 103 are circuited with the relay 134 by way of first and second AND gates 132 and 133.

These AND gates 132, 133 are arranged to receive a train of clock pulses on one of their two input terminals from a clock pulse generator 131. Accordingly while the light switch 102 is open, the movable contracts of the relay 134 assume the illustrated positions and a train of pulses are supplied to the UP count port and the DOWN count port of the first up/down counter 135 when the movable contacts 103A and 103B are closed, respectively. On the other hand, when the light switch is closed the pulses are supplied to the UP and DOWN count ports of the second up/down counter 136.

The ignition ON status detection circuit 137 is circuited with the first input terminals of and gates 138 and 140. The second input terminals of these gates are connected respectively with count discrimination circuits 139 and 141. As shown, the first count discrimination circuit 139 is connected with the output of the first up/down counter 135 while the second 140 is connected in a corresponding manner with the output of the second up/down counter 136. These circuits are arranged to compare a predetermined default value with the most recently used one and to produce a high level signal in the event that the currently used value is higher than the default one.

Relay 142 is arranged to selectively connect one of the up/down counter output terminals with a wave generation circuit 143. In this instance, when the light switch is open the daylight operation up/down counter 135 is circuited with the above mentioned wave generator.

The just mentioned wave generation circuit 143 is connected with the light switch 102, a memory 144 and a driver circuit 145. The output of the driver circuit 145 is connected with a display unit illumination control means.

The wave generation circuit 143 is arranged to be responsive to the closure of the light switch 102 in a manner to switch from generating wave forms suitable for daylight driving to ones suitable for night driving. At the same time, the switching of the relay 142 supplies the required illumination level data.

When the ignition switch 121 is closed, the ignition ON status detection circuit 137 is arranged to respond and to output a high level signal "1" to the first input terminals of the AND gates 138 and 140. At the same time the count discrimination circuits 139 and 141 output signals indicative of the instant count levels. As the AND gates 138 and 130 are respectively connected with the reset terminals of the up/down counters 135 and 136 respectively, upon the ignition switch being closed, both of the counters are reset to predetermined or preset count levels in the event that the counts registered in the count discrimination circuits 139 and 141 are above predetermined default levels.

It should be noted that the above circuit arrangement has been shown as associated with only a single illumination control arrangement, it is deemed obvious to those skilled in the art how the circuit be arranged in a system of the nature shown in FIG. 3 and provided with a noise filter such as interface 125.

THIRD EMBODIMENT

Figure 6:
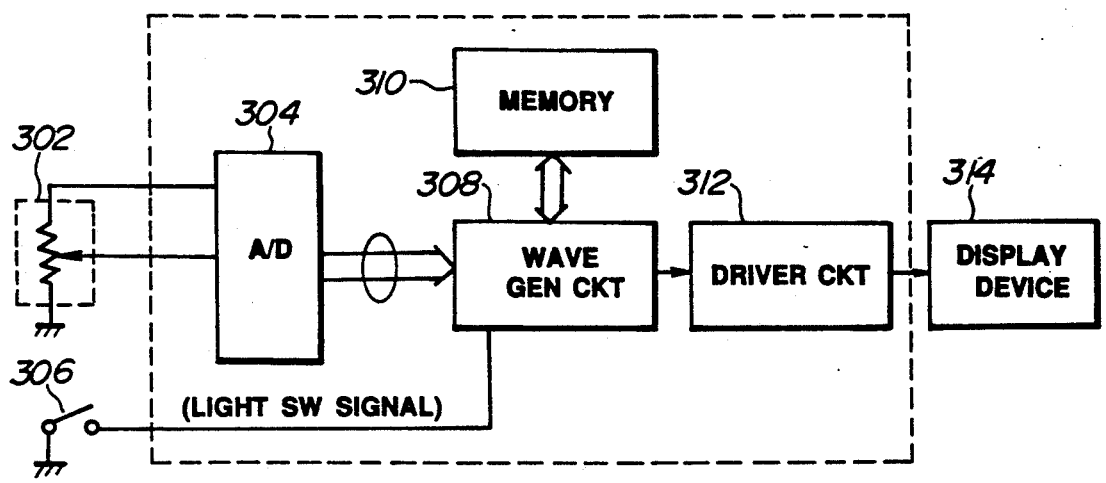
FIGS. 6 to 8 show the construction and operation of a third embodiment of the present invention which features an analog type illumination control arrangement.
Figure 7:
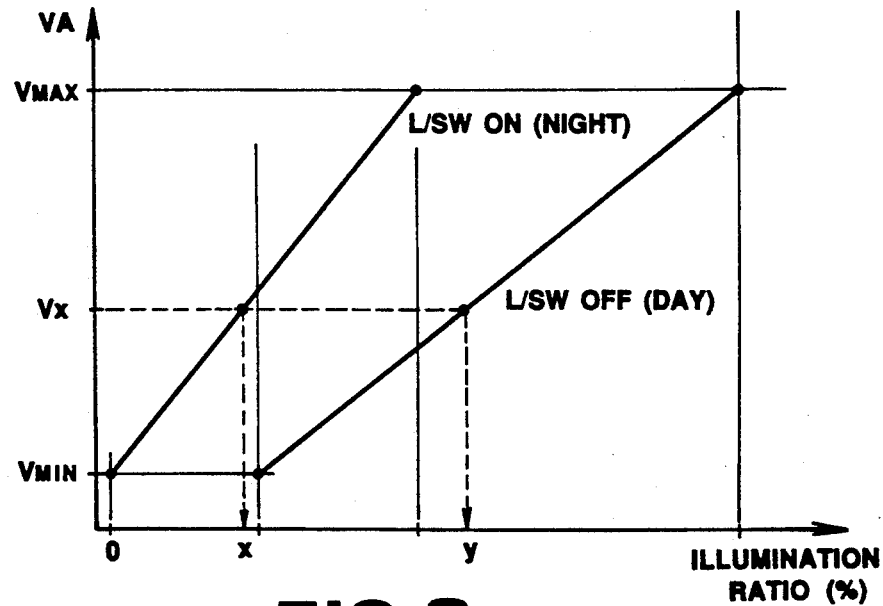
Figure 8:
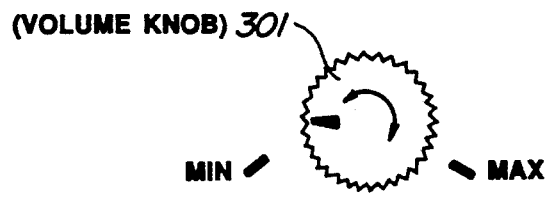

FIGS. 6 to 8 show a third embodiment of the invention. In this instance the embodiment includes a "volume" type illumination level control arrangement. Viz., in place of switches which are suited to button type operation, such as utilized in the first and second embodiments, the instant arrangement features the use of a knob 301, which can rotated similar to the volume control on a radio.

It will be noted that for simplicity of illustration, only the elements essential to performing the control which characterizes the instant embodiment are shown. Viz., in this arrangement a knob controlled variable resistor 302 is connected to an A/D converter circuit 304 while the light switch 306 is circuited with a wave generation circuit 308. Data is bussed to the just mentioned circuit from the A/D converter 304 and a memory 310.

The output of the wave generation circuit 308 is applied to a driver circuit 312 and therefrom to an illumination device 314.

The wave generation circuit 308 is arranged to be responsive to the light switch 306 in a manner to increase the gain at which the illumination is increased when the switch is closed with respect to rotation of the knob 301, and is further arranged such that for any given setting V of the variable resistor 302, the amount of illumination produced with the light switch 306 closed is less than when the switch is open. Viz., merely by way of example, let it be assumed that the volume knob 301 has been rotated to a position wherein the resistance developed by the variable resistor 302 is Vx. In the case the light switch 306 is closed, the amount of illumination is controlled to x % while when the switch is open the amount of illumination is y %.

As will be appreciated, with this type of arrangement it is possible for the driver to set the amount of illumination of the image appearing on the windshield to exactly the desired level. This eliminates the problem that the digital stepwise type of control which is apt to occur with a button controlled count-up and count-down type of wherein the desired illumination level may be just a fraction too high or too low and/or difficult to achieve without several repetitions of counting-up and counting-down.

FOURTH EMBODIMENT

FIGS. 9 to 12 show a fourth embodiment of the invention. This arrangement is directed to a further improvement of the basic embodiment and features automatic control of the illumination level. Although this embodiment will be described showing only the elements required for automatic control, this arrangement can be arranged with either the button type or volume knob type level control arrangements disclosed in the first, second and third embodiments, to allow the level to be firstly set to the driver's liking and any temporary changes, such as caused by tunnels, clouding over of the sun, oncoming headlights at night, the setting or rising of the sun, etc., compensated for by the automatic control.

Figure 11:
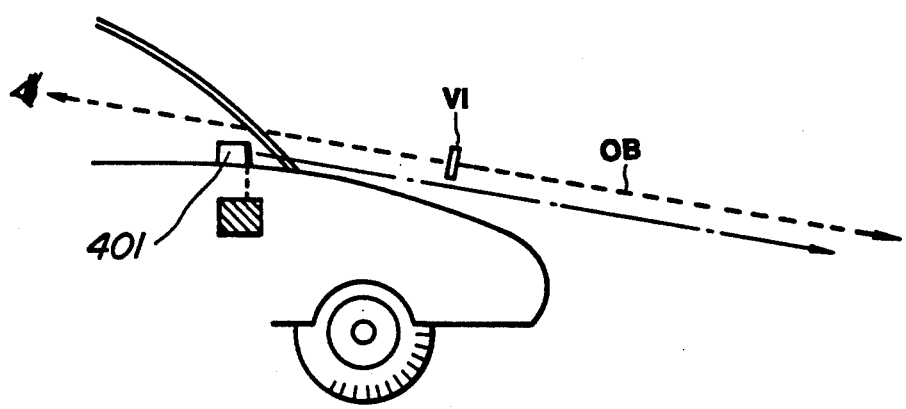

In FIG. 11 the position at which the virtual image which from the projection onto the windshield, is observed by the driver is denoted by VI. A light sensor 401 is focused in a manner to detect light rays which are passing either along or which are parallel with the line of observation OB which passes through the image formed on the windshield and the virtual image.

Referring now to FIGS. 9 and 10 details of the circuit elements which characterize the fourth embodiment are shown. In this arrangement a volume knob operated variable resistor 402 is connected with an A/D converter 404 in a manner similar to the previous embodiment. The light sensor 401 in this case comprises a phototransistor 406 and an amplifier 408. The output of the amplifier 408 is fed to the A/D converter 404. The volume control data and that which is derived by digitizing the analog output of the amplifier 408, are fed to a correction circuit 410. The correction circuit 410 is circuited with a light switch 412 and mode control switch 414. In this embodiment, the correction circuit 404 is arranged to be toggled between three different modes of operation by the mode control switch 414. In this embodiment, the modes are full-automatic, semi-automatic and manual.

The correction circuit 410 is arranged to produce data signals indicative of the corrected illumination ratio based on the digitized volume and light sensor output signals.

The nature of each of these modes will become more clearly understood when a discussion of the operation of this embodiment is made hereinafter with reference to the flow chart of FIG. 12.

The correction circuit 410 is operatively connected with a wave generation circuit 416 which is arranged to produce a PWM (pulse width modulation) signal. This wave generation circuit 416 is also connected with the light switch 412, a memory 418 and a driver circuit 420 in the illustrated manner. The output of the driver circuit 420 is fed to the illumination circuit 422 of a display unit.

Details of light sensor 401 are shown in FIG. 10. As will be appreciated, an operational amplifier 424 has its negative terminal connected with the emitter of the phototransistor 406 and its positive terminal connected with a source of stabilized constant voltage Vref. The output terminal of the amplifier 424 is feedback connected with the negative input terminal of the same via first and second parallel resistors R1/4 and R2/4. These resistors are arranged to be selective circuited between the output and negative terminals in response to the output of the light switch 412. Viz., as shown, a first switch 426 is arranged to be responsive to the closure of the light switch in a manner to assume a closed state and thus connect resistor R1/4 between the above mentioned terminals. An inverter 428 is arranged between a second switch 430 and the light switch 412. Accordingly, this switch 430 is induced to close when the light switch 412 is open and vice versa.

In brief, when the light switch 412 is open the second resistor R2/4 is connected between the output and negative input of the operational amplifier 424, and when the light switch 412 is closed resistor R1/4 is connected in place of R2/4.

Figure 12:
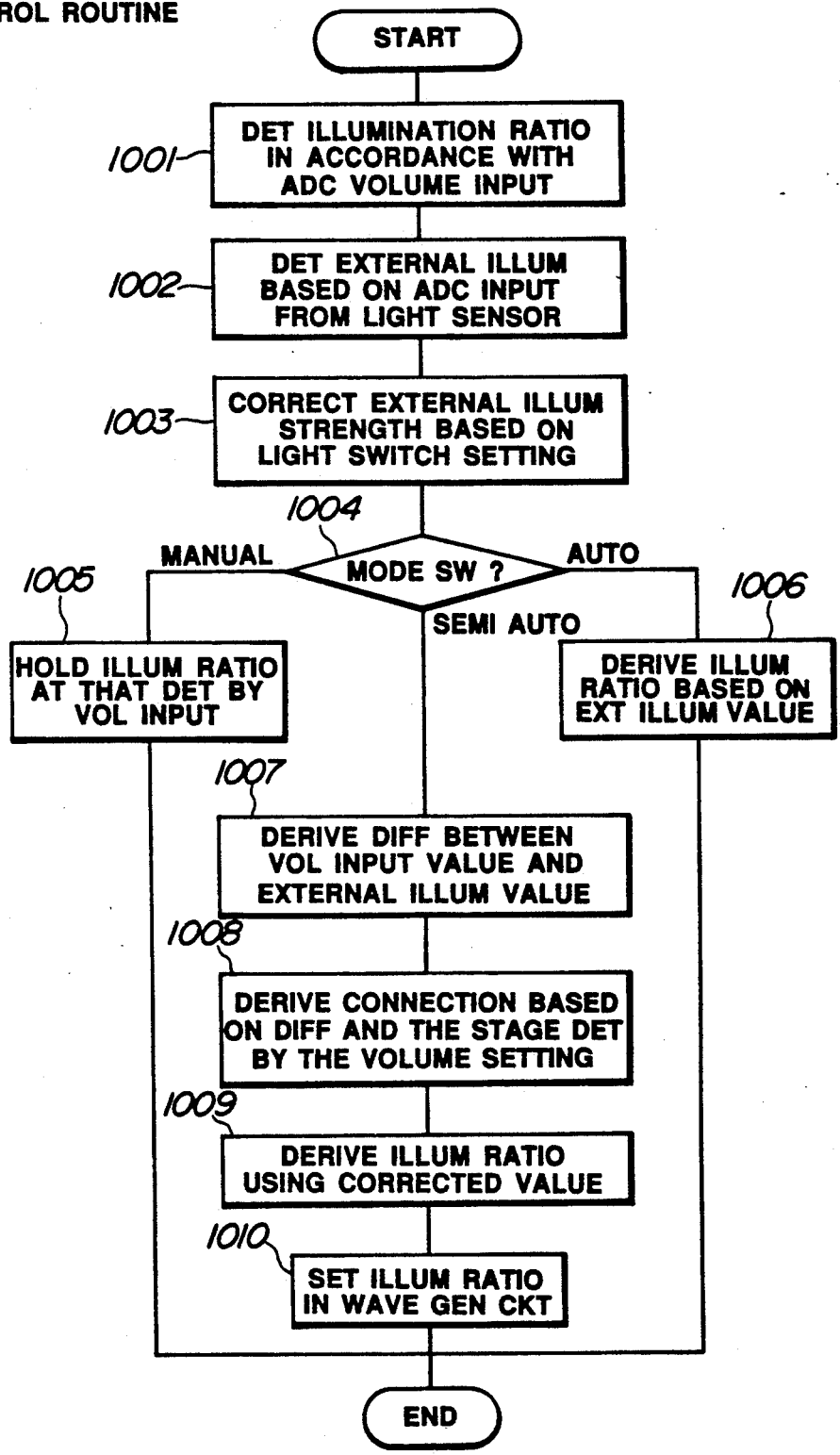
FIG. 12 is a flow chart showing the steps which characterize the operation of the fourth embodiment.

FIG. 12, shows in flow chart form, the basic steps which are executed during the operation of the instant embodiment.

At steps 1001 and 1002 the required illumination ratio and the amount of external illumination are determined based on the digitized data inputs from the light sensor and the volume control. Following this at step 1003 the status of the light switch 412 is sampled and the effect of the external illumination is accordingly corrected. At step 1004, the mode which is currently selected is determined. In the event that the manual mode has been selected the program flows to step 1005 wherein the illumination ratio is set at that which is indicated necessary by the digitized input from the volume control. On the other hand, in the event that the fully automatic mode has been selected, then at step 1006 the illumination is derived based on a full correction of the manually selected level based on the sensed external illumination level.

However, in the event the semi-automatic mode is selected, then the routine flows to steps 1007 to 1010 wherein the difference between the manually selected illumination level and detected level of external illumination is determined. In these series of steps, the basic illumination ratio value is modified in accordance with the external illumination degree in a manner wherein the corrected value falls in a range of +100% to −50% of the manually induced one. Viz., the value selected is modified in a manner wherein the actual illumination level is reduced.

It will be noted that if the correction factor is set in a manner to be either 1 or 0.5 then the circuit response can be improved while the resulting illumination setting is approximately adapted to the external illumination.

FIFTH EMBODIMENT

Figure 13:
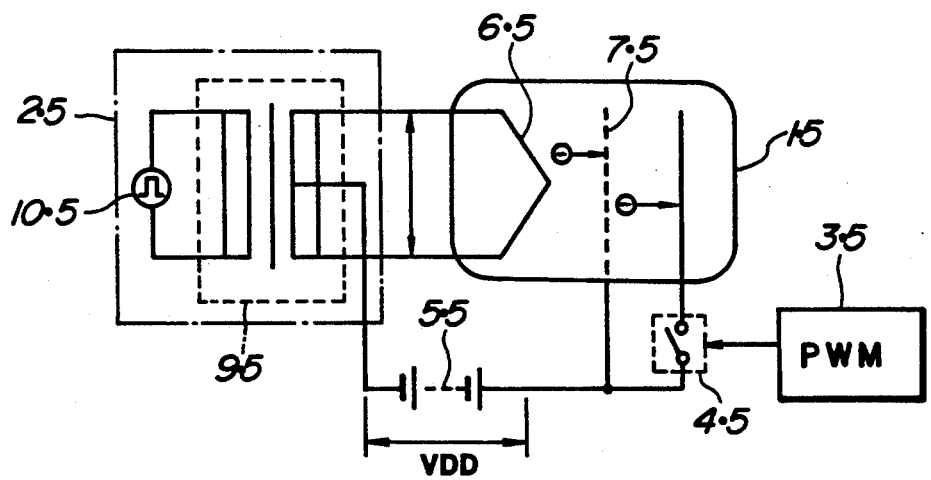
FIG. 13 is a simplified diagram showing the constructional features of previously proposed illumination control arrangements and which has been discussed earlier under the heading of Prior Art.
Figure 14:
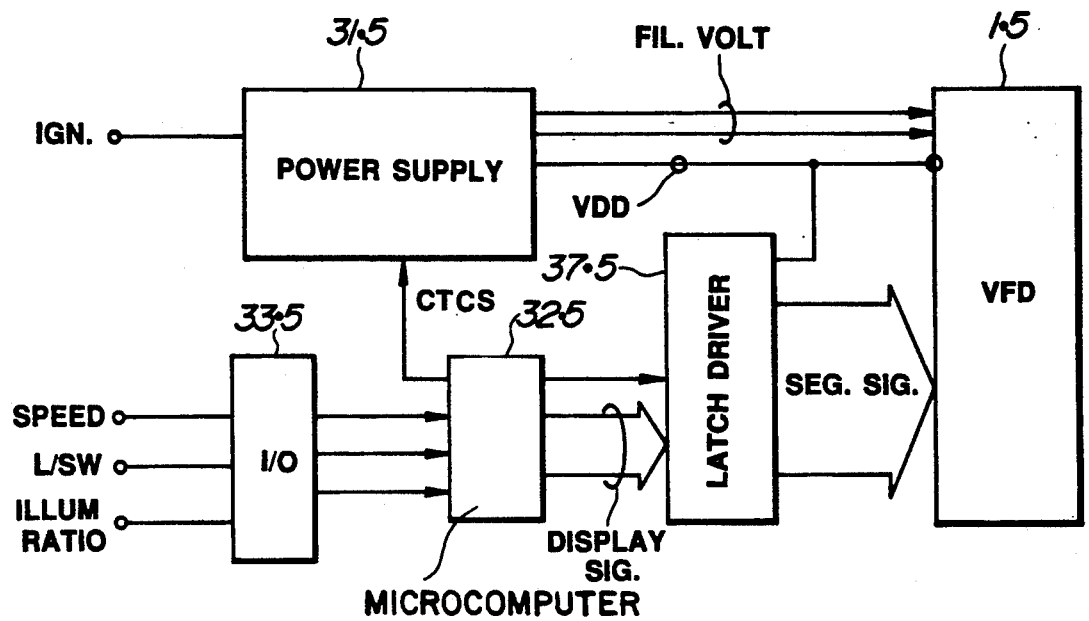
FIGS. 14 and 15 show circuitry which characterizes the construction of a driver circuit which is used to control the illumination of the VFD tubes used in the HUD and meter display arrangements depicted in FIG. 3, for example.
Figure 15:
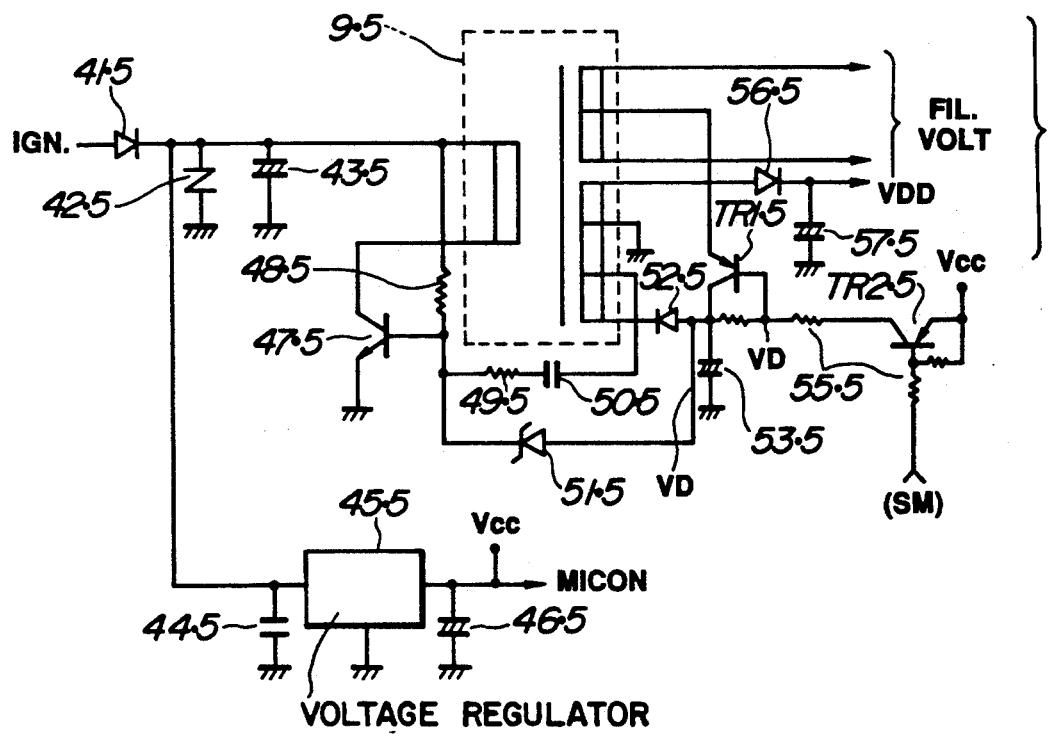

FIGS. 13 to 15 show the circuitry which relates to and/or characterizes the construction and arrangement of a driver circuit which is used in connection with the control of a large scale type VFD units, such as used in the HUD and meter display units.

In brief, the fifth embodiment is aimed at providing arrangement which can control the illumination produced by a high intensity type VFD tube type image generating unit in a manner wherein suitable illumination can produced in an automotive head-up display during both day and night operation. In this embodiment this is achieved by controlling the voltage applied to the center tap of the above described type of arrangement, in combination with controlling the duty cycle of the signal applied to the segment electrode with respect to that applied to the grid in a manner wherein illumination ratio (the duty with which points of illumination are produced) can be reduced.

FIG. 13 shows the previously proposed arrangement discussed briefly in the opening paragraphs of the instant disclosure. In more detail, this arrangement comprises a vacuum fluorescent display tube 1.5; a filament driver or excitation circuit 2.5; three PWM circuits 3.5 which are arranged to supply an image signal to the segment electrode (anode) and blanking electrodes (not shown) and to act as a decoder driver; a switch 4.5 which is arranged to be switched on and off in accordance with the PWM signal, a power supply 5.5 which is arranged to provide a predetermined voltage VDD; a filament electrode 6.5; a grid 7.5; a segment electrode 8.5; a transformer 9.5 which forms part of the filament driver circuit 2.5 and pulse generator or source 10.5 which is arranged with the transformer 9.5 in the illustrated manner.

The operation of this circuit is such that when a voltage Ef is applied to the VFD tube 1.5 by the filament driver circuit 2.5, electrons are supplied to filament electrode 6.5. At the same time a voltage VDD is applied to the filament and the center tap. As a result, electrons are accelerated toward the segment electrode in a manner to impinge thereon and produce a points of illumination.

The switch 4.5 is switched back and forth between its On and OFF positions in response to the levels of the PWM signals produced by the three PWM circuits included in the decoder driver circuit 3.5 assuming levels "1" and "0" respectively, and thus control the selective illumination and extinction of given points by the blanking electrodes.

When the PWM signal assumes a high level, electrons impinge on the segment electrode and a point of illumination is produced. On the other hand, when the signal assumes a low value illumination is extinguished.

By controlling the duty cycle with which the switch 4.5 is operated, the illumination level of the VFD tube 1.5 can be controlled.

However, with this type of arrangement, the speed with the points of illumination can be established and extinguished is limited (in the order of several tens of μs). Accordingly, in order to prevent flickering of the image the duty cycle of the PWM signal is limited. This induces the drawback that the illumination degree cannot be readily reduced to the degree desirable.

Accordingly, when this type of high intensity type VFD tube is used in arrangements such as disclosed in connection with the first to fourth embodiments, it is difficult to reduce the illumination degree to that which is required when the vehicle is being operated at night in order to prevent the image produced on the windshield from appearing too bright irrespective of the provision of such arrangements as a light sensor controlled automatic level control (e.g. as provided in the fourth embodiment).

FIGS. 14 and 15 show the driver circuit arrangement of the fifth embodiment which is directed to improving this facet of the HUD system.

FIG. 14 shows the overall arrangement of the driver circuit while FIG. 15 shows details of the power supply circuit which is shown in the upper left-hand corner of FIG. 14.

In FIG. 14 the power supply circuit 31.5 is operatively connected with the engine ignition IGN and a microcomputer 32.5. The microcomputer 32.5 is arranged to generate a center tap control signal CTCS and supply the same to the power supply circuit which includes a filament electrode center tap voltage control arrangement. The filament voltage and the center tap voltage (display voltage) VDD is supplied to the VFD tube. It will be noted that this arrangement is essentially the same as that of the prior art arrangement shown in FIG. 13.

On the other hand, the microcomputer 32.5 receives a speed signal from a speed sensor, a night/day mode requirement signal from a light switch and an illumination ratio signal, by way of an interface 33.5. The microcomputer 32.5 contains a memory in which data pertaining to the illumination characteristics which are required for day and night operation and PWM generating arrangement, and is arranged to generate the center tap control signal, the PWM signal and the display control signal.

A latch driver 37.5 is arranged to respond to the above mentioned two signals and to produce a first segment control signal and a second signal which is applied to the grid.

The circuit shown in FIG. 15 includes a diode 41.5 which receives the signal from the ignition; a noise suppression element 42.5; a condenser 43.5; a three terminal voltage regulator 45.5; a condenser 43.5; a transistor 48.5; a resistor 49.5; a condenser 50.5; a Zener diode 51.5; the previously mentioned transformer 9.5; a diode 52.5; a condenser 53.5; a bias device which comprises: transistors TR1.5, TR2.5 and resistors R1.5 & R2.5; a diode 56.5 and a condenser 57.5; all connected as shown.

The operation of this arrangement is such that during daylight operation, the microcomputer 32.5 outputs a high level center tap control signal ("1") to the gate of the transistor TR2.5 in response to the illumination ratio signal which is applied to terminal 36.5. In response to this the transistor TR2.5 is rendered conductive and assumes an ON state. The emitter of transistor TR1.5 potential VD, and the voltage across the base and emitter VBE becomes equal to VD+VBE. It will be noted that in this instance that VD=VD'.

However, under these conditions the illumination reduction is prevented and the VHD tube exhibits bright emission levels.

On the other hand, during night operation, when it is required to reduce the illumination level, the signal appearing on the terminal 6.5 assumes a level which induces the microcomputer to apply a low level center tap control signal ("0") to the base of TR1.5 and results in transistor TR2.5 being rendered conductive. Accordingly, a potential VD' which is between Vcc and VD is developed due to the voltage dividing effect of resistors R1.5 and R2.5. The potential appearing on the emitter of transistor TR1.5 assumes a value of VD'+VBE and the illumination voltage which is applied to the VFD tube assumes a level of VDD+VD'+VBE and the brightness level of tube is reduced.

In addition to the above, the VFD tube continually receives the PWM signal at the same time as the center tap control signal.

It will be noted that with the instant embodiment, the segment control signal is applied to the center tap but not to the grid. However, it is within the scope of the present invention to apply the segment control signal to both at the same time.

SIXTH EMBODIMENT

Figure 16:
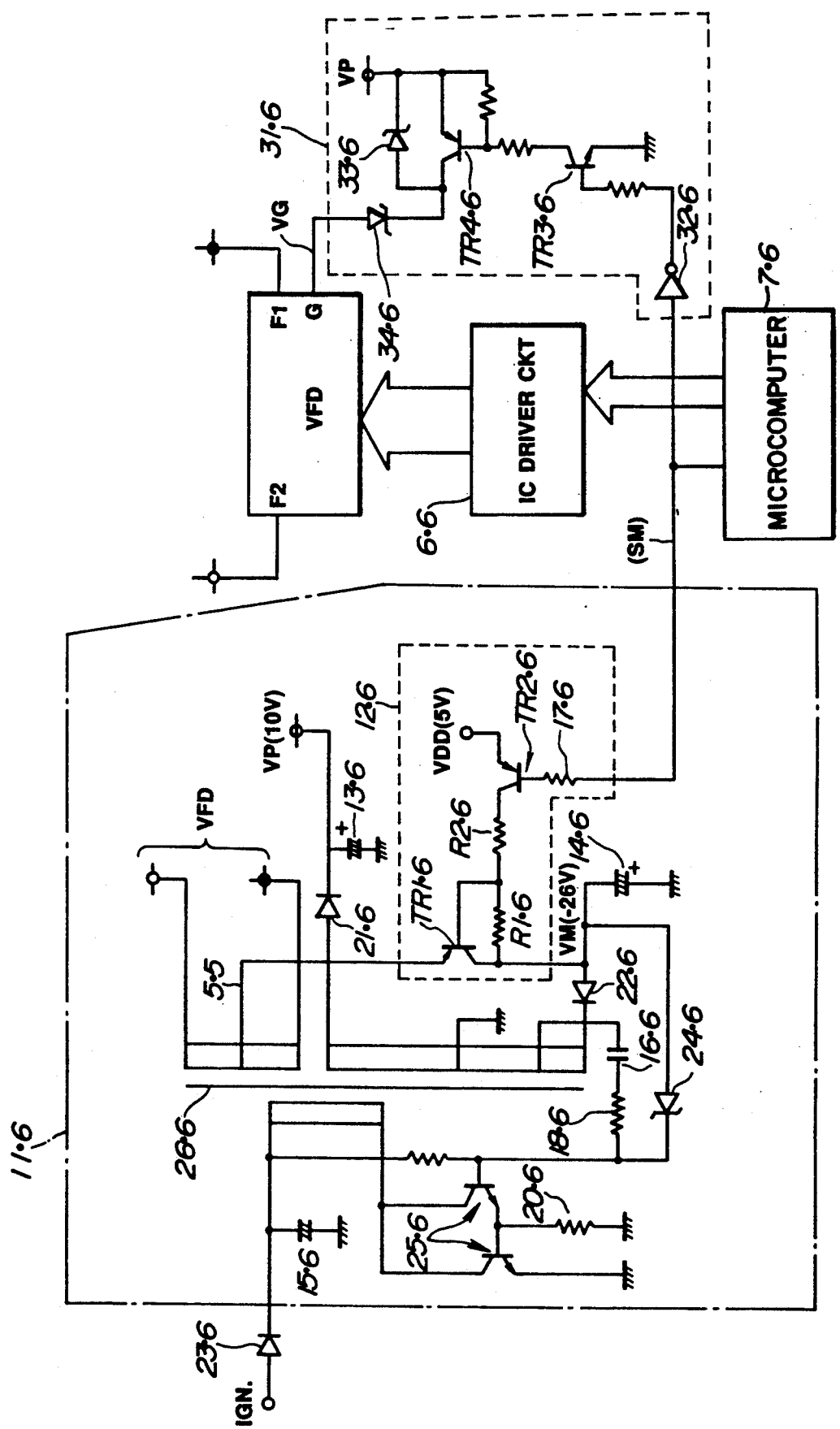
FIGS. 16 and 17 show sixth and seventh embodiments of the present invention which features the provision of a grid voltage control circuit.
Figure 18:
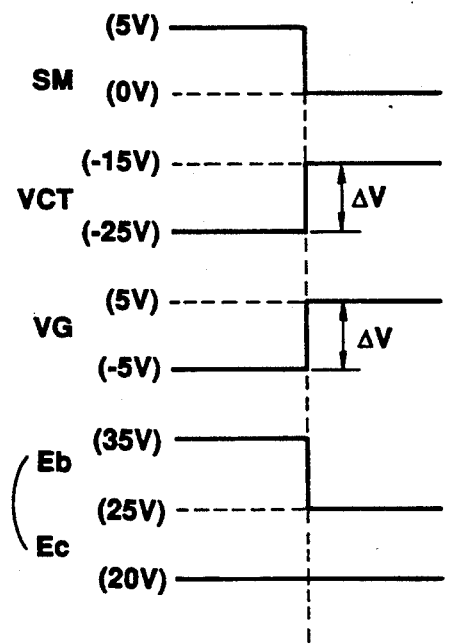
FIGS. 18 and 19 are timing charts which depict the operation of the sixth and seventh embodiments, respectively.
Figure 19:
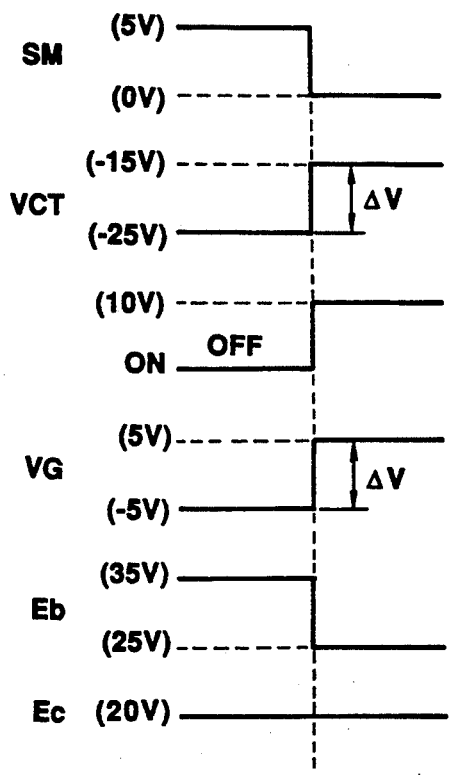

FIGS. 16, 18 and 19 relate to a sixth embodiment of the present invention. This embodiment features the selective control of the voltage appearing on the grid terminal G of the VFD.

In this arrangement in order to control the illumination level of a VFD tube type image generating arrangement, the display voltage (e.g. the grid voltage Ec and the anode voltage Eb) are controlled whereby the illumination reduction voltage control circuit which controls the voltage at the filament center tap (VCT) with respect to the voltages appearing at the above mentioned grid and the anode, takes the form of a microcomputer which includes an IC driver circuit which provides ON/OFF type anode control.

In operation, when the microcomputer 7.6 issues a illumination or center tap control signal SM having a high level "1" (5 V), this signal is applied to the base of a transistor TR2.6 which forms part of an illumination voltage circuit. This results in TR2.6 becoming non-conductive and current not passing through resistors R1.6 and R2.6. Under these conditions, the voltage VCT appearing on the filament center tap assumes a level equal to the sum of Vm+Vbe (−25 volt) wherein Vbe is the potential drop which occurs across the base and the emitter of transistor TR1.6.

At this time the voltage level which appears on the filament is reduced by a predetermined amount below that appearing on the grid and the anode electrodes whereby the potential difference between Ec and Eb is increased. The electron flow is increased and the illumination degree is increased to a high level.

On the other hand, when it is desired to reduce the illumination level, the level of the signal SM is reduced to a low level (0 Volt). This results in transistor TR2.6 being render conductive whereby current flows through resistors R1.6 and R2.6, the potential difference between VDD and VM is divided by said resistors. The potential appearing on the base of the transistor TR1.6 is boosted by the influence of resistor R1.6 and VCT=VM+VR1+VBE (−15 V). The potential difference between Ec and Eb is reduced and results in the illumination degree being reduced.

In order to further improve the control the illumination degree of a VFD tube, the instant embodiment includes a grid voltage control circuit 31.6 which is arranged to be responsive to the center tap control signal SM.

In this embodiment when SM exhibits a high level, an inverter 32.6 applies a low level signal to the base of transistor TR3.6 rendering the same non-conductive. This prevents the grounding of the base of transistor TR4.6 and thus also induces the same to assume a non-conductive state. Under these conditions, the voltage VG which is applied to the grid of the VFD tube assumes its lower level (−5 V) as shown in FIG. 19b, due to the circuiting of the two Zener diodes 33.6, 34.6 in the illustrated manner.

On the other hand, when the SM signal assumes a low level, the voltage which is applied to the center tap VCT assumes a value of −25 V while a high level signal is applied to the base of transistor TR3.6 rendering the same conductive. This induces transistor TR4.6 to also become conductive. This induces the voltage VG appearing on the terminal G to rise to a 5 Volt level.

The operation of the instant embodiment is shown in timing chart form in FIG. 18.

The provision of the grid voltage control circuit 31.6 suppresses variations in the illumination degree which tend to occur due to the changes or differences in the level of the VCT voltage.

SEVENTH EMBODIMENT

Figure 17:
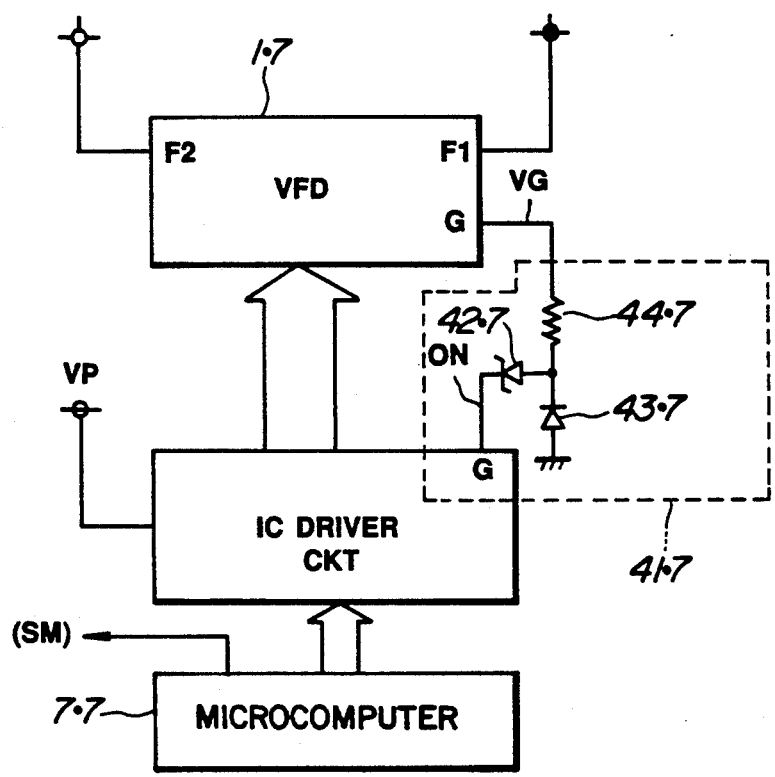

FIG. 17 shows a seventh embodiment of the present invention. In this arrangement the microcomputer 7.7 is arranged to produce a signal which takes the form of the inverse of the signal SM and to bus this inverse signal along with a plurality of other data, to the driver IC 6.7. In other words, when SM assumes a high level the corresponding signal On assumes a low level and vice versa. The driver IC responds to the On signal having a low level in a manner wherein a low level signal (0 volt) appears on a terminal G' thereof while when the On signal exhibits a high level, the voltage on terminal G' is raised to a high level (10 volt).

A grid voltage control circuit 41.7 is arranged to interconnect the G' terminal of the driver IC with a grid terminal G of the VFD 1.7. As shown, this grid voltage control circuit 41.7 includes a Zener diode 42.7, a diode 43.7, and a resistor 44.7, connected as shown.

As will be appreciated from FIG. 19 the operation of this circuit is such that when SM assumes a high level, the inverted signal On assumes a low one. The voltage applied to the G terminal assumes low level (−5 volt) and the potential difference between Eb and Ec is maximized. On the other hand, when SM exhibits a low level, VCT changes from −25 volt to −15 volt; On rises from 0 volt to +10 volt; VG changes from −5 volt to +5 volt; and the difference between Eb and Ec is reduced.

EIGHTH EMBODIMENT

FIGS. 20 to 23 show a eighth embodiment of the present invention. This embodiment is directed to improving control of the illumination level in a manner which prevents a sudden change in illumination level when the system is switch between day and night control. It is possible in the embodiment shown in FIG. 5 for example to arbitrarily set the day and night illumination levels independently of one another. While the stopping and re-starting of the engine is such that both the up/down counters 135, 136 are rest to predetermined levels, the possibility that the individual levels can be set so that a remarkable difference exists therebetween and when the light switch conditioning is changed from one state the other the driver may find the illumination level either to low or too high.

Figure 20:
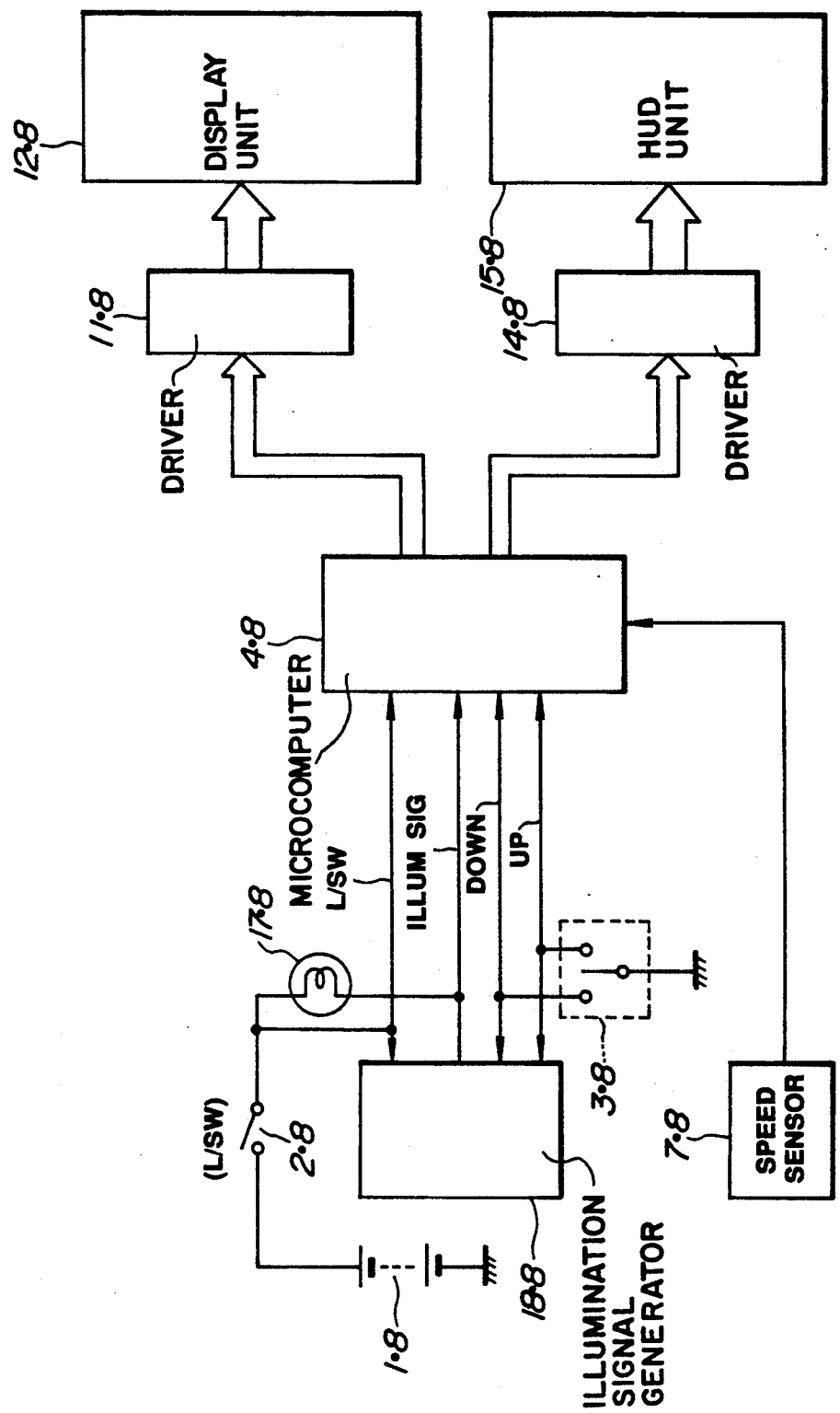
FIGS. 20 to 23 show an eighth embodiment of the present invention which is directed to improving control of the illumination level in a manner wherein sudden changes in illumination level when the system is switch between day and night control, are prevented.

FIG. 20 shows the overall arrangement of the eighth embodiment.

In this arrangement 1.8 denotes a battery, 2.8 denotes a light switch (L/SW), 3.8 a up/down count switch, 4.8 a microcomputer circuit, 12.8 a meter display unit, 11.8 a meter display driver circuit, 15.8 a HUD unit, 14.8 a HUD driver circuit, 17.8 a lamp (or lamps) for illuminating the meter display unit and 18.8 a circuit for generating a illumination signal and which includes the functions described in connection with the illumination control circuit 106 shown in FIG. 3.

It should be noted that, although not shown, the meter display unit 12.8 includes a plurality of other displays and is not limited to speed indication alone. As will be understood the unit can include displays which relate to the operation and control of an air-conditioner, radio, stereo-audio system etc. These just mentioned other displays can be controlled in a manner essentially similar to the units 12.8 and 15.8.

Figure 21:
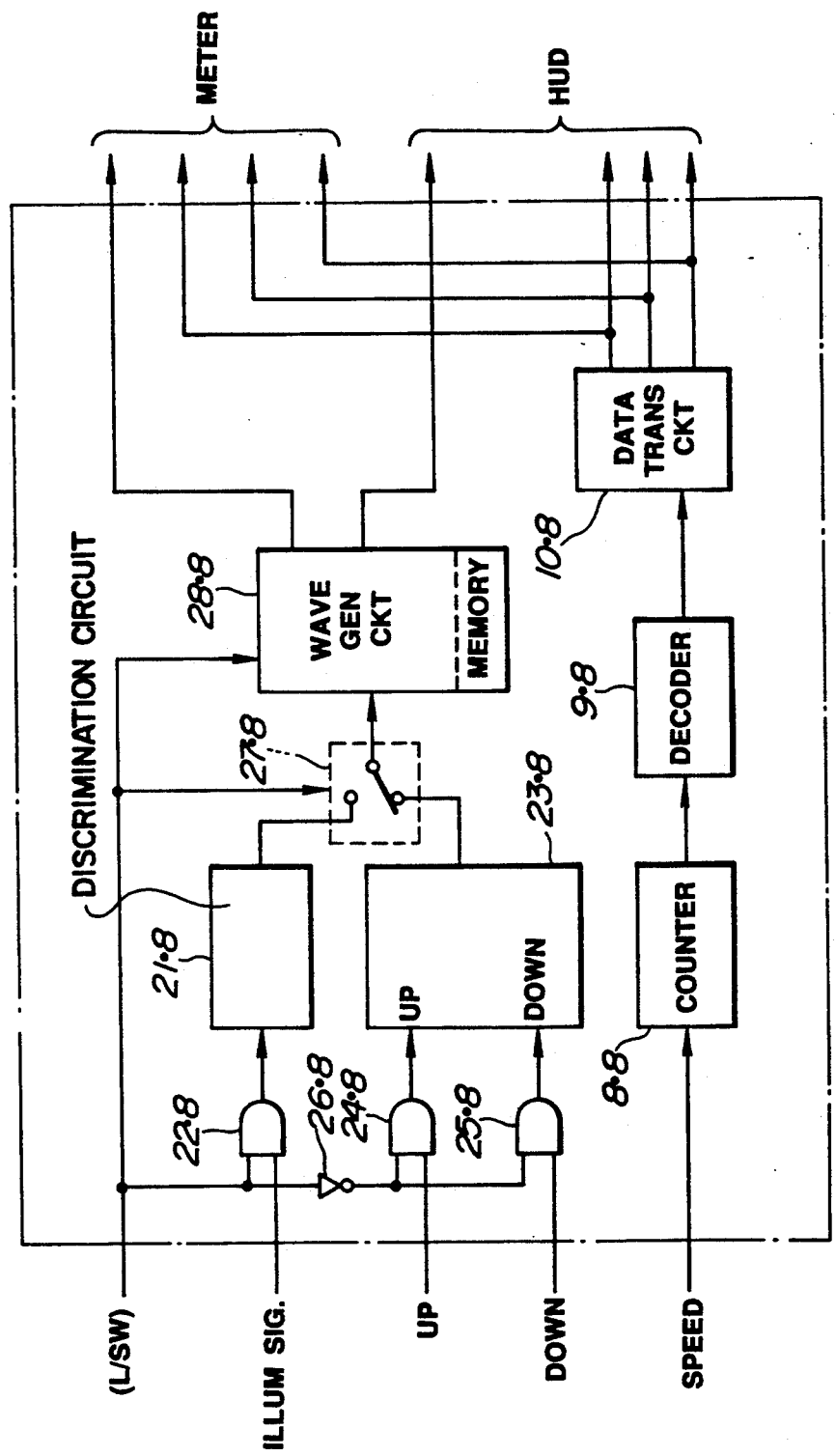

FIG. 21 shows in more detail the construction which characterizes the above mentioned microcomputer circuit 4.8. In this figure, 21.8 denotes an illumination level discrimination circuit which is arranged to receive a light switch signal via an AND gate 22.8. This AND gate 22.8 is also arranged to receive an input from the light switch 2.8 and thus is arranged in a manner to be open and thus permit the transmission of the illumination ratio signal to the illumination level discrimination circuit 21 when the vehicle is undergoing night operation (viz., the light switch is closed).

An up/down counter 23 is arranged to receive inputs from the up/down switch 3.8 via AND gates 24.8 and 25.8. An inverter 26.8 is interposed between the light switch 2.8 and the first input terminals of the just mentioned two AND gates 24.8, 25.8. Accordingly, when the light switch 2.8 is open, a high level signal is applied to these first input terminals. On the other hand, when the switch 2.8 is closed, low level signals are applied thereto thus blocking any changes in the current count registered in the up/down counter.

A relay 27.8 is interposed between a wave generating circuit 28.8 and the illumination stage discrimination circuit 21.8 and the up/down counter 23.8. The relay 27.8 and the wave generating circuit 28.8 are both connected with the light switch 2.8. When the switch 2.8 is closed the movable contact of the relay 27.8 is arranged to pivot upwardly (as seen in the drawings) and to switch the illustrated connection to one wherein the output of the illumination stage discrimination circuit 21.8 is connected with the wave generating circuit 28.8 in place of the up/down counter 23.8.

In this figure, the wave generating circuit 28.8 contains a memory as indicated by broken line. This memory contains data of the nature stored in elements such as 144 of the second embodiment (see FIG. 5).

The speed indicative signal from the vehicle speed sensor 7.8 is applied to counter 8.8 which develops a count indicative of the instant vehicle speed. A decoder 9.8 is operatively interposed between the vehicle speed counter 8.8 and a data transmission circuit 10.8.

The operation of this arrangement is such that, during the day or under conditions when the light switch 2.8 is off, the level of light switch is "0". This closes AND gate 22.8 and opens gates 24.8 and 25.8. The relay 27.8 assumes the illustrated state wherein the up/down counter 23.8 is connected with the wave generation circuit 28.8. The latter mentioned circuit 28.8 is also conditioned for daylight operation by the presence of the low level light switch signal. In accordance with this conditioning, the wave generation circuit reads out the appropriate data from memory and generates signals in accordance with the characteristics denoted by the solid line trace "A" in FIG. 23. As will be noted this data is stepwisely graduated in terms of illumination ratio.

Under these conditions when the up/down switch 3.8 is operated, the illumination levels of the HUD and the meter display units are changed. It will be noted that at this time the lamp 17.8 is not energized.

Figure 22:
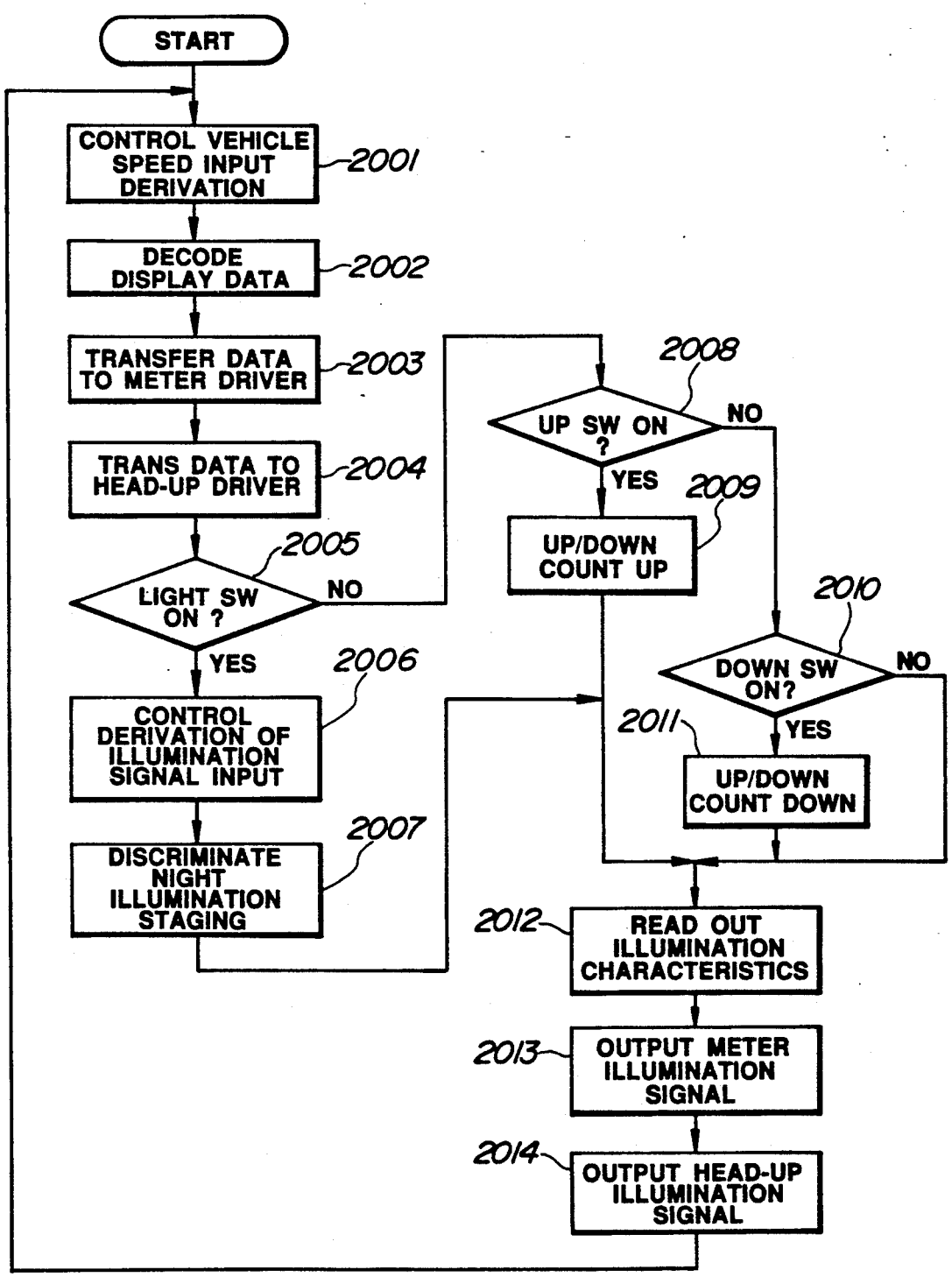
Figure 23:
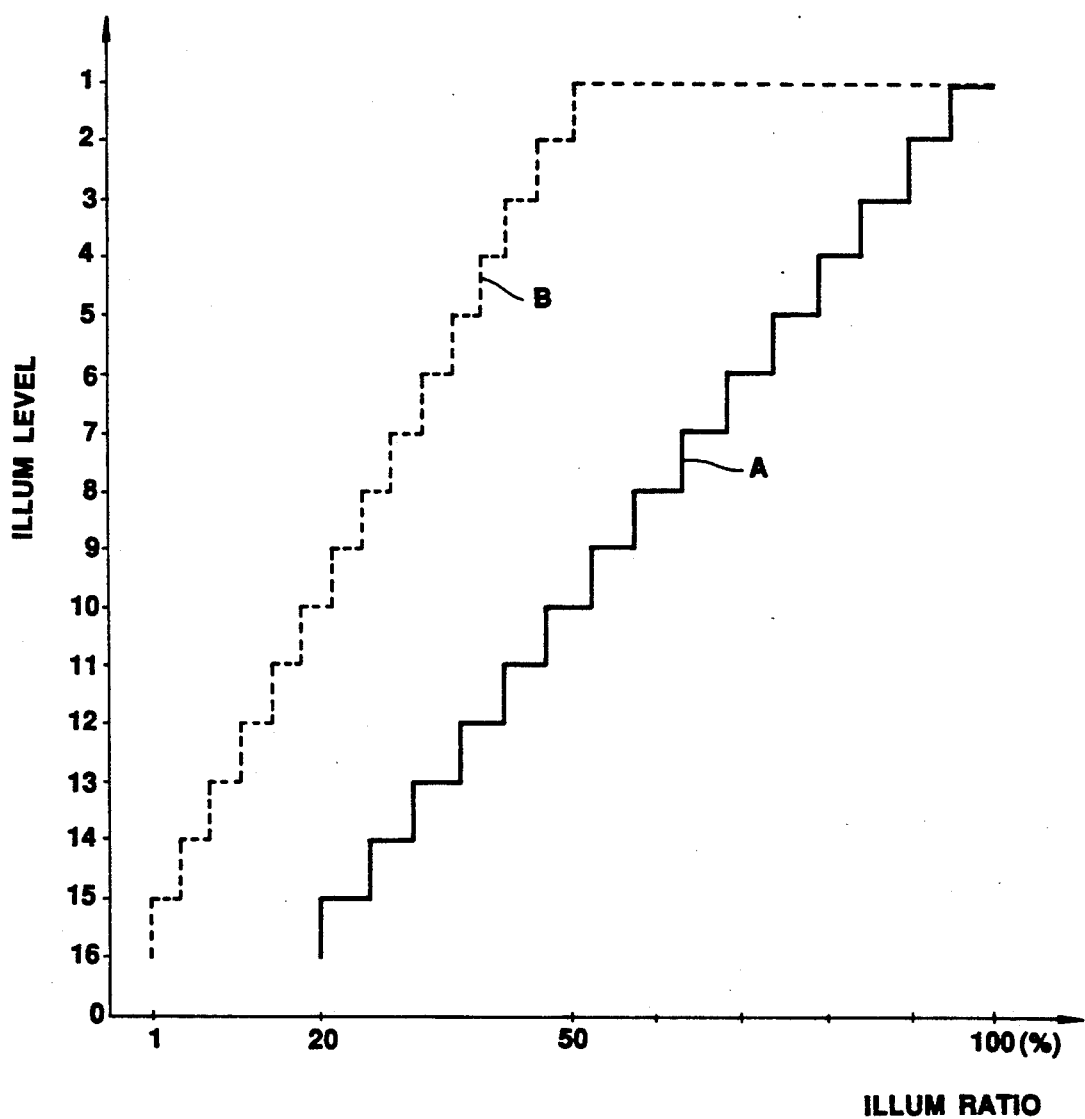

Reference is now made to the flow chart shown in FIG. 22 which depicts the characterizing operations which take place during the operation of the the eighth embodiment.

As will be noted, the first step of this routine is such as to sample the counter 8.8 in order to determine the instant vehicle speed. At steps 2002-2004 the instant speed count is converted into image data and transferred to the driver circuits 11.8 and 14.8 which are associated with the meter display and HUD display units 12.8 and 15.8. This data of course appears as images depicting the instant vehicle speed.

At step 1005 the instant status of the light switch 2.8 is sampled and the determination made of the switch is on or not. In the instant embodiment, this decision is carried out by the relay 27.8.

In the event that the switch is ON, then the routine flows across to the step 2008 wherein the port connected to the up count terminal of the up/down count switch 3.8 is sampled and it is determined if the switch is closed in a manner which demands increase in illumination of not. If the answer is affirmative, then at step 2009 a command which incrementally increases the count is issued. On the other hand, if the outcome of the inquiry is negative, then at step 2010 the port to the down count terminal of the up/down counter 3.8 is sampled. If a reduction in illumination is indicated, then at step 2011 an appropriate incremental decrease in the down count in induced.

However, if the light switch 2.8 is found to be ON in step 2005 the routine flows to steps 2005 and 2007. Under these conditions the AND gate 22.8 is open while gates 24.8 and 25.8 are closed. This as mentioned above, prevents the counts which are registered in the up/down counter 23.8 from being modified. At the same time the setting of the relay 27.8 is changed by moving the movable contact upwardly as seen in the drawings and the wave generation circuit is conditioned to read out data suited for night operation. This data is such as to induce the characteristics shown by the broken line trace B in FIG. 23. Lamp 17.8 is illuminated at this time.

Depending on the duty ratio of the illumination signal which is applied to the AND gate 22 from circuit 18.8, the appropriate illumination level is selected from trace B and used for control of the illumination of the meter and HUD display units.

Accordingly, the illumination control is rendered automatic during night operation.

As will be understood this embodiment lends itself to ready combination with the light sensor equipped embodiment shown in FIGS. 9 to 11.

NINTH EMBODIMENT

The ninth embodiment of the present invention features the inclusion of a DC-DC converter which stabilizes the operation of the system.

Figure 24:
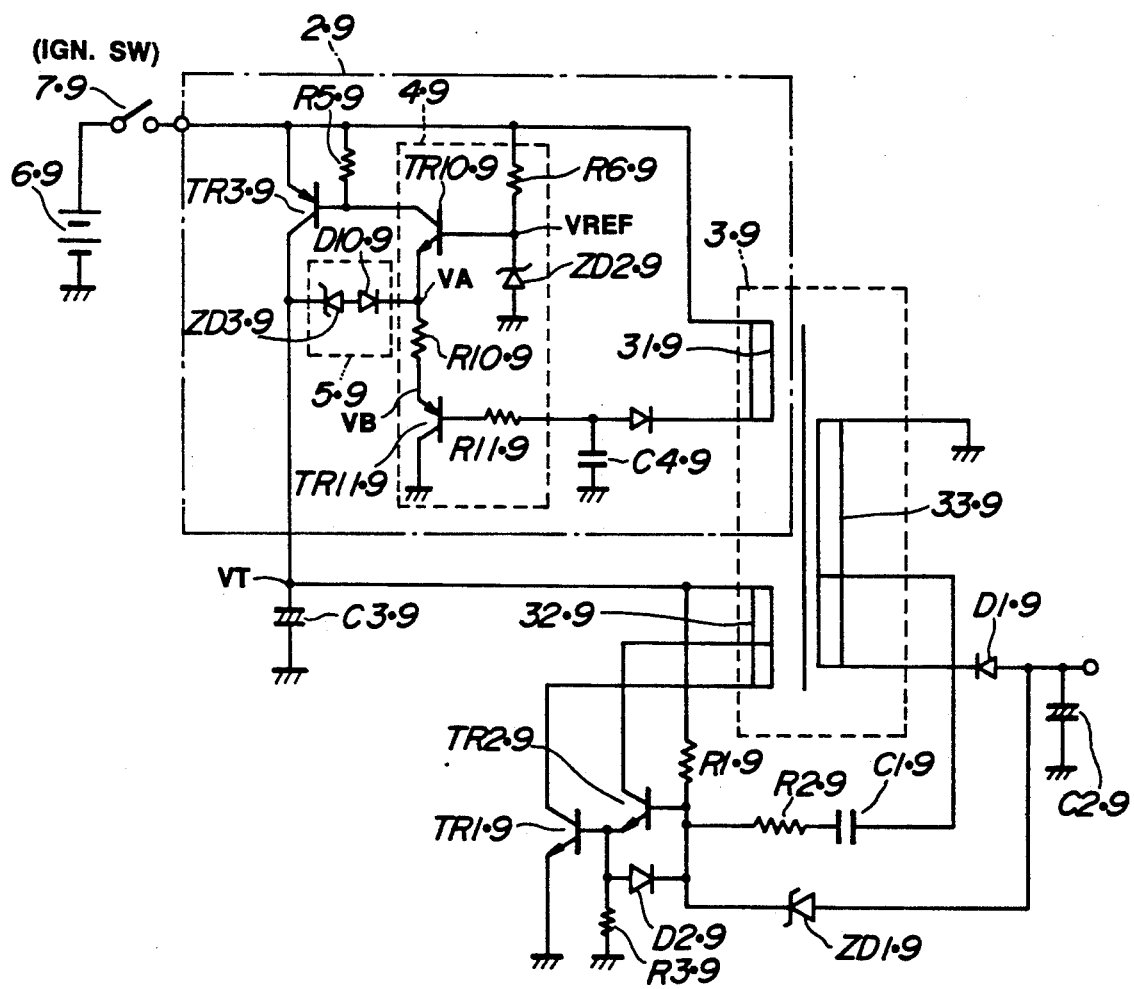
FIGS. 24 and 25 show a ninth embodiment of the present invention which features the inclusion of a DC-DC converter which stabilizes the power supply of the system.

As shown in FIG. 24, this circuit 1.9 denotes a power input terminal; 2.9 denotes a stabilizing circuit which acts as a fuse; 3.9 denotes a transformer; C3.9 a primary side smoothing condenser; R1.9 a start up resistor; TR1.9, TR2.9 a Darlington pair; R3.9 a resistor; D2.9 a diode; R2.9 and C1.9 a resistor and a capacitor which are connected in a manner to define a feedback loop between the primary and secondary sides of the transformer 3.9; ZD1.9 a Zener diode; D1 and C2 a diode and a capacitor which are connected with the secondary side of the transformer 3 in the illustrated manner and 31.9 and 32.9 denote the primary and secondary coils of the transformer 3. Numerals 4.9 and 5.9 denote constant current circuits.

The stabilizing circuit is connected with the primary and secondary coils of the transformer 3.9 and includes a transistor TR3.9 which controls the ON/OFF control of the current flow in the secondary coil 33.9. A resistor R5.9 is connected across the base and emitter of this transistor.

The constant current circuit 5.9 is connected between the collector of TR3.9 and the first constant current circuit 4.9.

The power input terminal 1.9 is connected with a battery 6.9 upon closure of an ignition switch 7.9. The first constant current circuit 4.9 is arranged so that the base and emitter of TR3.9 are connected by a transistor TR10.9. This connection is such that the connection between the base of TR10.9 is and the emitter of TR3.9, is established via resistor R6.9. The base of transistor TR10.9 is also connected to ground by way of a Zener diode ZD2.9. As will be noted, with this arrangement the base of transistor TR10.9 is connected to the power input terminal 1.9 by way of resistor R6.9.

The emitter of transistor TR10.9 is connected by way of resistor R10.9 to the emitter of a transistor TR11.9. The collector of TR11.9 is connected to ground while the base is connected with diode D3.9 by way of resistor R11.9. The capacitor C4.9 is connected between ground and a node defined between resistor R11.9 and diode D3.9 while the latter is connected with the primary coil 31.9 of the transformer 3.9. It should be noted that the primary coil 31.9 is also connected with the input terminal side of resistor R6.9.

The constant current circuit 5.9 comprises a Zener diode ZD3.9 and a diode D10.9 which are connected directly in a back to back relationship as shown. The Zener diode ZD3.9 is connected with the collector of TR3.9 while the diode D10.9 is connected to the emitter of transistor TR10.9.

Figure 25:
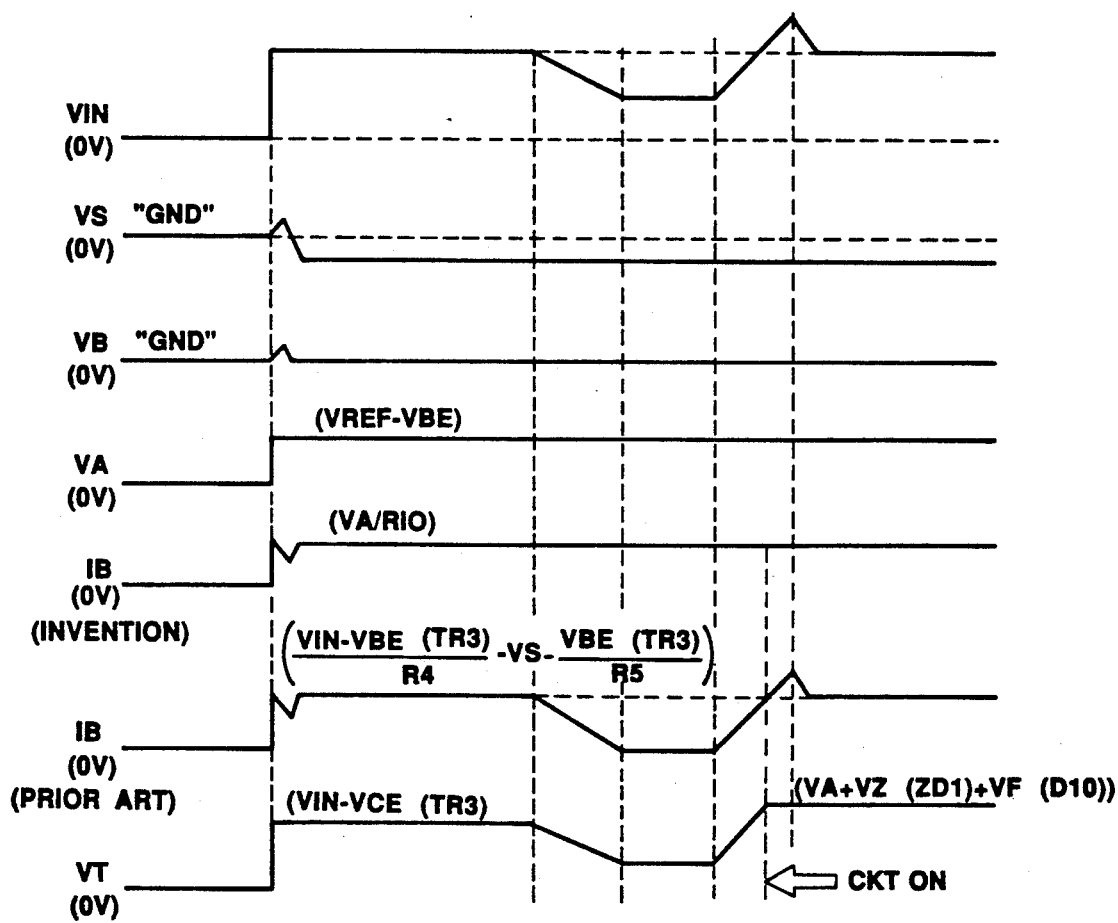

Referring now to the timing chart shown in FIG. 25. As shown, when ignition switch 7.9 is closed a reference voltage Vref is developed at a node defined between the resistor R6.9 and Zener diode ZD2.9 and the potential VA appearing at the emitter of transistor TR10.9 becomes VA=Vref−VBE10 (note that VBE10 is the voltage which develops between the base and the emitter of transistor TR10.9).

The potential appearing on the emitter of TR11.9 becomes VB=Vs+IB×R11+VBE11 (note that VS is the voltage which appears at the node between diode D3.9 and condenser C4.9; IB is the current flow at the base of transistor TR3.9; R11 is the resistance of resistor R11.9; and VBE11 is the potential difference between the base and emitter of transistor TR11.9).

It should be noted that when the ignition switch is initially closed the voltage Vs is approximately zero. The current flow IB at the base of transistor TR3.9 becomes (VA−VB)/R10 (where R10 is the resistance of R10.9). If the converter is arranged so that after start up VS<0−VBE11, it is possible to induce the situation wherein VB=0 and the current flow IB at the base of transistor TR3.9 does not assume the status of the power input electrode 1.9.

Further, the constant current circuit 5 is such that is the case of a surge in the voltage appearing on the power input terminal 1.9 the converter is protected.

TENTH EMBODIMENT

The tenth embodiment relates to an improvement the system which relates to a power supply circuit for use with microcomputers of the nature described above in connection with embodiments 1 to 9.

PRIOR ART

In previously proposed prior art power supply circuits which have been applied to microcomputer circuits including memories wherein a back-up function is essential it has been usual to provide first and second supply arrangements. When the system is operating normally, the first power supply arrangement functions as the main supply which supplies a voltage to the CPU and associated components of the system when the ignition switch is closed. The second arrangement is designed to act as a back-up supply which supplies a voltage and is to maintain the data which is written in the memory during operations wherein the main supply is cut-off.

In other words, when the ignition switch is closed, the first main power supply is used while when the switch is open the second back-up supply is utilized.

These arrangements have included a timing control circuit which receives both of the first and second voltages and is responsive to the supply of the first voltage signal to output a reset signal to the CPU and the termination of the first supply to stop the operation of the CPU and to issue a stand-by for back-up supply signal to a RAM. This timing circuit further includes the function supplying a clock pulse to the CPU during the period irrespective of which power source is being used.

However, this arrangement has suffered from the drawback that with the dual supply type of arrangement, the provision of the timing circuit is essential. This of course complicates the hardware of the system and circuit pattern along with the software (control routines) which is required to control the operation of the device.

In the case a ROM is utilized a finite amount of time is required to manage the various operations and controls which must be conducted between the ROM and CPU. Thus, in order to provide this additional time it is necessary to increase the capacity of condensers.

To overcome this the tenth embodiment of the present invention proposes to provide a circuit which has a only a single power supply circuit 2 and a relatively simple timing circuit.

In brief, this embodiment is such that the power supply circuit is connected with a battery via an ignition switch in a manner wherein, when the switch is closed, a signal is applied to the base of a transistor which is accordingly rendered conductive and a voltage Vcc is supplied to the CPU in place of a back-up voltage Vdd. When the ignition switch is opened the transistor is rendered non-conductive and the back-up supply Vdd is circuited with the CPU and associated elements and data which is stored therein is protected from loss.

Figure 26:
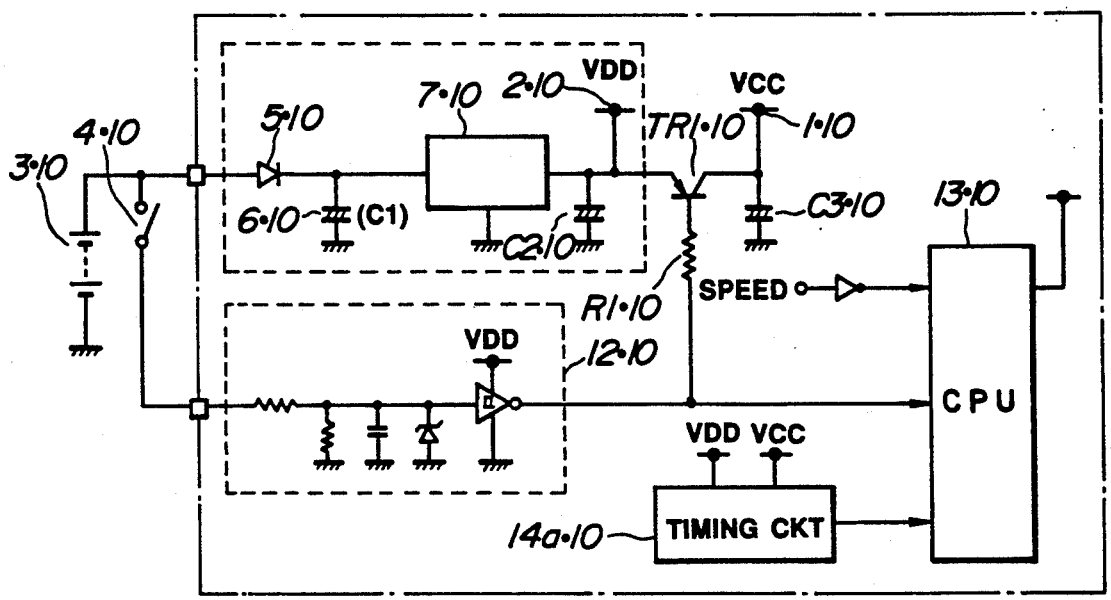
FIGS. 26 to 30 show circuit arrangements according to a tenth embodiment of the invention which relates to an improved power supply circuit for use with microcomputers of the nature utilized in embodiments 1 to 9.

Turning now to FIG. 26, a tenth embodiment of the present invention is shown. As in the former cases, for the sake of clarity, only the circuits and elements directly connected with the construction and arrangement which characterizes the instant embodiment are shown.

When the ignition key 4.10 is closed the signal appearing on the output terminal of the interface circuit 12.10 assumes a low level due to the provision of the inverter therein. This permits transistor TR1.10 to become conductive and establishes communication between the main supply and back-up circuits 1.10 and 2.10. Accordingly, battery voltage is impressed on the main power supply circuit 1.10.

Under these conditions, the CPU 13.10 is energized in a manner wherein while the ignition switch remains closed, processing of data and the like is possible.

However, when the ignition switch 4.10 is opened, the resulting low level signal is inverted and a high level signal is produced on the output of the interface circuit 12.10. This renders transistor TR1.10 non-conductive. The connection between the main and auxiliary circuits is cut-off and capacitor C3.10 discharges. At the same time, as a high level appears on the output of the interface circuit 12.10 and this output is directly connected to the microcomputer, the presence of an ignition OFF mode is immediately detected. Accordingly, a standby mode wherein the data currently contained in work space and other volatile memories are recorded, latched or otherwise protected from loss.

Figure 29:
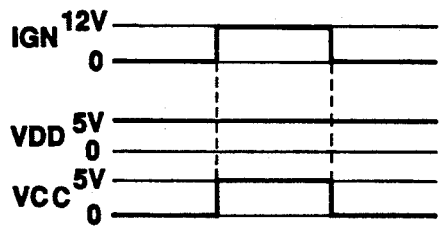

The above operations will be understood from the timing chart shown in FIG. 29.

It should be noted that with the instant embodiment, when the ignition switch is open, transistor TR1.10 is rendered non-conductive and the Vcc and Vdd circuits are isolated from one another.

ELEVENTH EMBODIMENT

Figure 27:
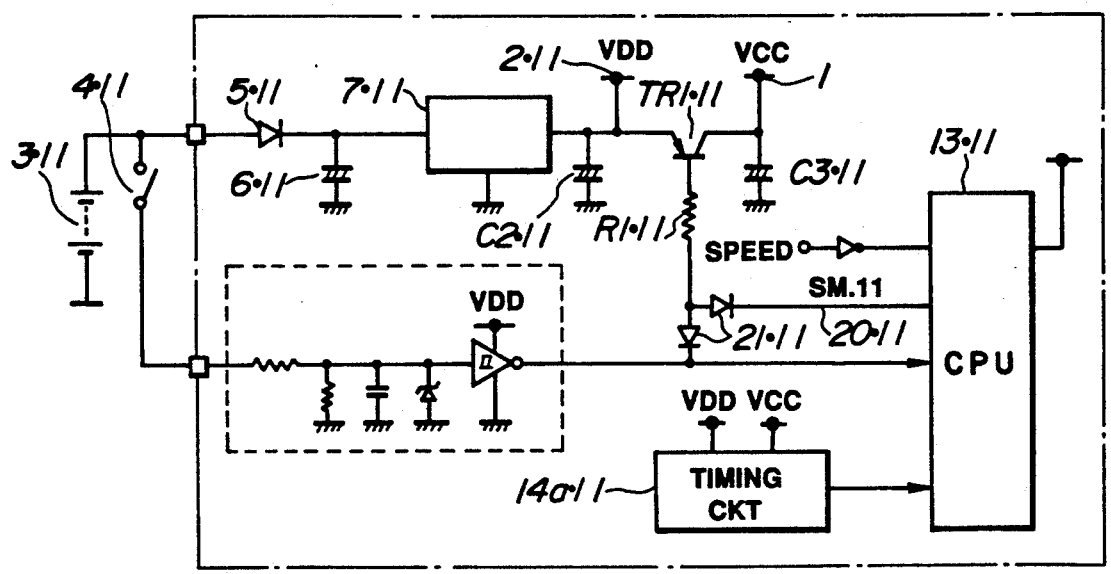

This embodiment is essentially similar to the tenth one and differs in that, as shown in FIG. 27, a power source control signal SM.11 is outputted from the microcomputer circuit 13.11 along line 20.11. This line is connected with the interface 12.11 output terminal via diodes 21.11 which define an AND gate arrangement. Line 20.11 is further connected with the base of transistor TR1.11 by way of resistor R1.11.

With this arrangement, even when the interface circuit 12.11 outputs a high level signal, while the CPU 13.11 outputs a low level signal, the transistor TR1.11 cannot be rendered non-conductive. The CPU 13.11 is arranged so that until such time as all important data and processes have been completed in response to the standby signal imputted thereto, the level of SM.11 is not raised to a high level. Until such time as the CPU 13.11 outputs a high level signal, power is maintained.

TWELFTH EMBODIMENT

Figure 28:
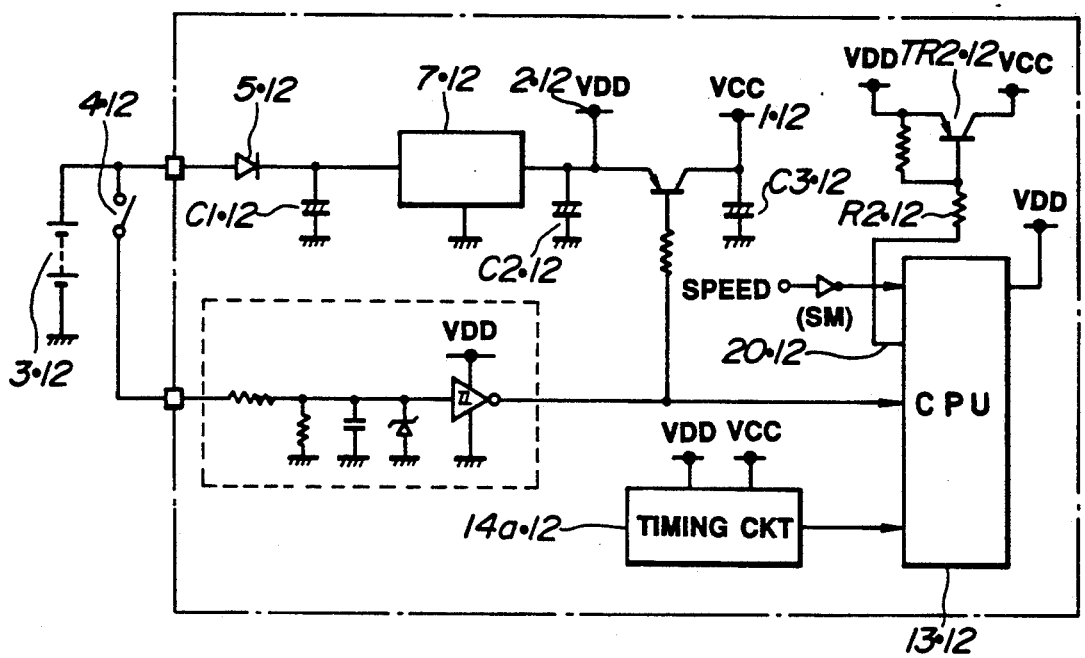

FIG. 28 shows a further embodiment of the present invention which relates to the power control of the microprocessors which form vital parts of the HUD display.

This embodiment differs from the 10th and 11th in that the control signal SM.12 is output along a line 20.12 to the base of a transistor TR2.12 via a resistor R2.12. As shown, the Vdd circuit is connected to the emitter of this transistor while the Vcc circuit is connected with the collector. The arrangement of transistors TR1.12 and TR2.12 is such as to permit the isolation of the main and back-up circuits and eliminates unnecessary elements from the circuitry. It should be noted, however, that when the signal SM20.12 rises to a high level, transistor TR2.12 is rendered non-conductive.

It is possible to increase the capacity of this circuit by increasing the transistors and connecting them in a manner which will be apparent from the forgoing disclosure. It is possible to modify the above embodiment in a manner which permits the control of a number of different power lines.

Figure 30:
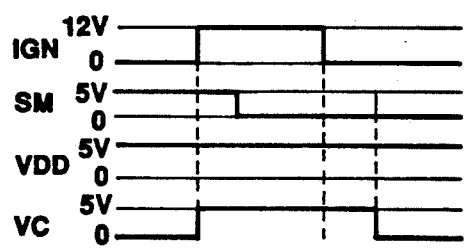

The timing chart shown in FIG. 30 demonstrates the operational characteristics of the 11th and 12th embodiments.

THIRTEENTH EMBODIMENT

Figure 31:
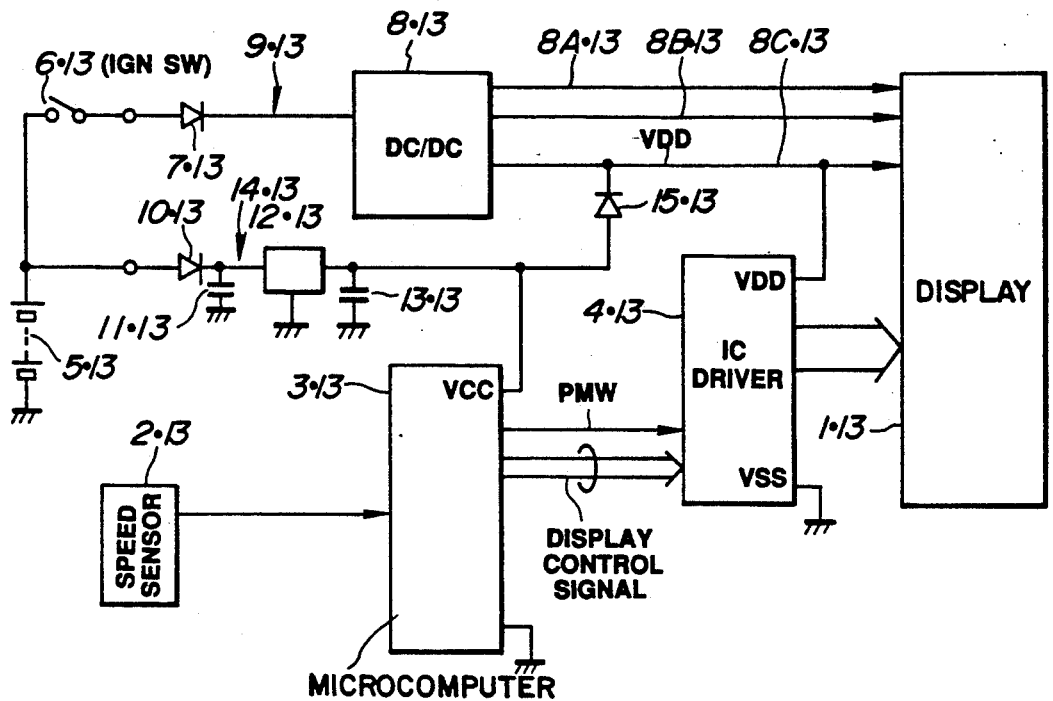
FIGS. 31 to 34 show circuits and a timing chart which pertain to thirteenth, fourteenth and fifthteenth embodiments of the present invention which are directed to stabilizing the current supply to the various elements which comprise the HUD and meter displays and to attenuating noise which may occur an which may interfere with the finally displayed images.

FIG. 31 shows a circuit arrangement in which a thirteenth embodiment of the present invention is incorporated. It will be noted that this embodiment is directed to stabilizing the current supply to the various elements which comprise the HUD and meter displays and to attenuating noise which may occur and which may interfere with the finally displayed images by producing undesired points of illumination and the like.

Figure 1:
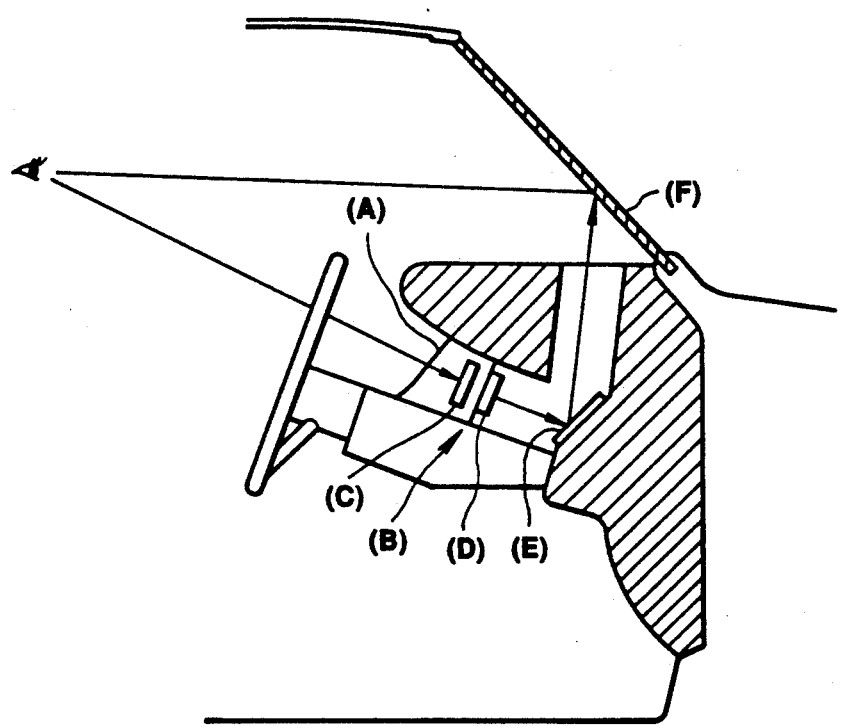
FIG. 1 shows in schematic elevation, an automotive information display arrangement which is arranged to enable data to be displayed on the meters of the instrument panel and on the windshield of the vehicle.
Figure 2:
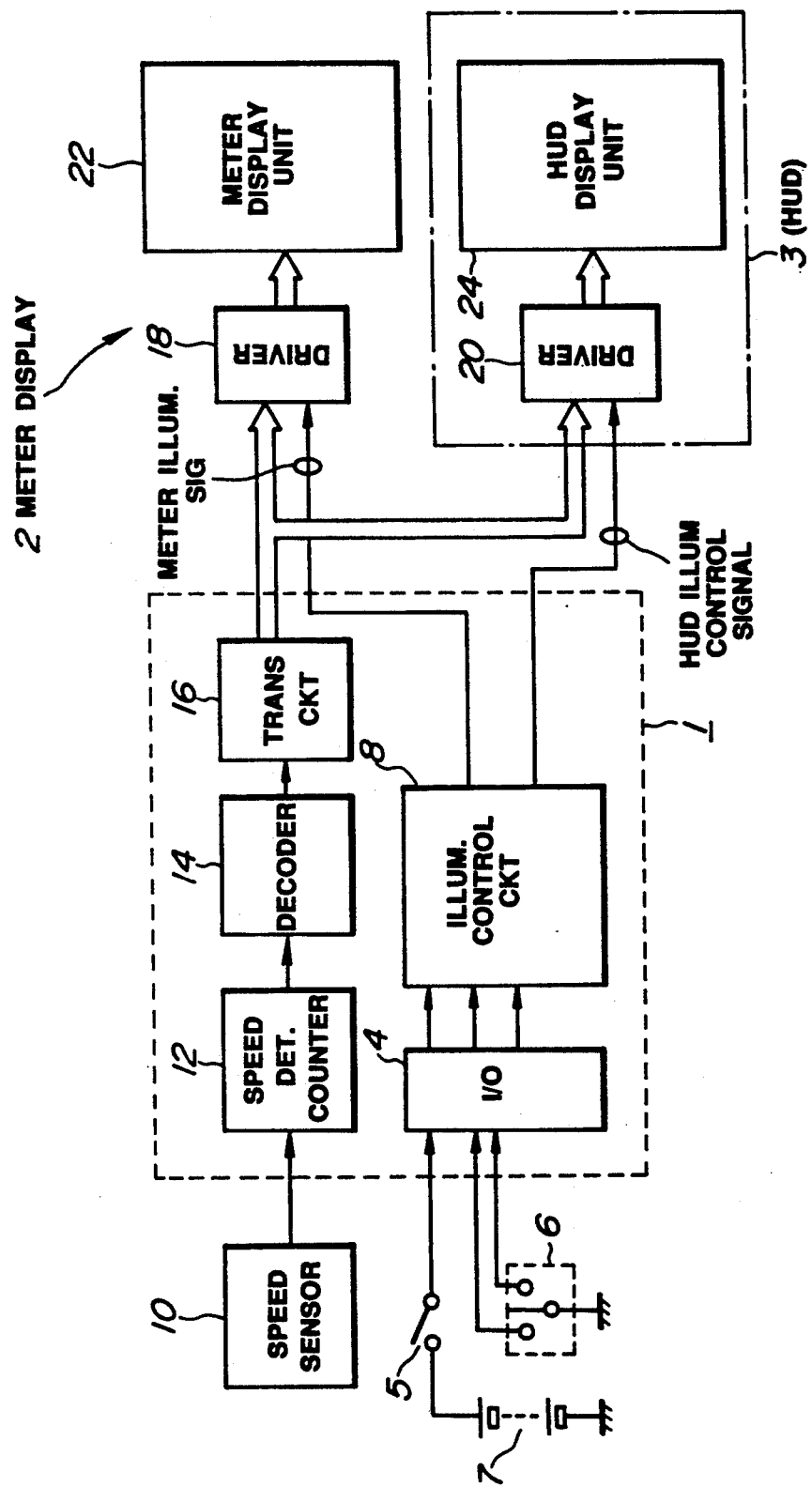
FIG. 2 shows an arrangement which is susceptible to noise and which was discussed in the opening paragraphs of the instant disclosure.

In FIG. 31 1.13 denotes a VFD type display tube which includes non-illustrated filament, grid and segment electrode elements. Numeral 2.13 denotes a vehicle speed sensor; 3.13 a microcomputer which is responsive to the speed input from sensor 2.13 and which generates PWM and display control signals; 4.13 a IC driver circuit which receives the PWM and display control signals and which buses the appropriate control data to the display tube 1.13.

Numeral 5.13 denotes a battery; 6.13 denotes an ignition switch which is connected with the battery; 7.13 a diode which is interposed between the ignition switch 6.13 and a DC-DC converter having a transformer and center tap of the nature disclosed in connection with the ninth embodiment of the invention.

The DC-DC converter is operatively connected with the filament electrode of the VFD display tube 1.13 and the Vdd terminal of the IC driver circuit 4.13. via lines 8A.13 and 8B.13 and 8C.13, respectively. The above mentioned elements combine to define a first power circuit generally denoted by 9.13 which supplies a voltage Vdd (primary source).

Numeral 10.13 denotes a diode; 11.13 a condenser; 12.14 a three terminal voltage stabilizing circuit; and 13.13 a condenser; which define second power circuit generally denoted by 14.13 which supplies a voltage Vcc (back-up source).

A diode 15.13 is operatively disposed between the first and second power circuits and is arranged to be connected to the line 8C.13 between the DC/DC converter and the Vdd terminal of the IC driver circuit 4.13.

Figure 32:
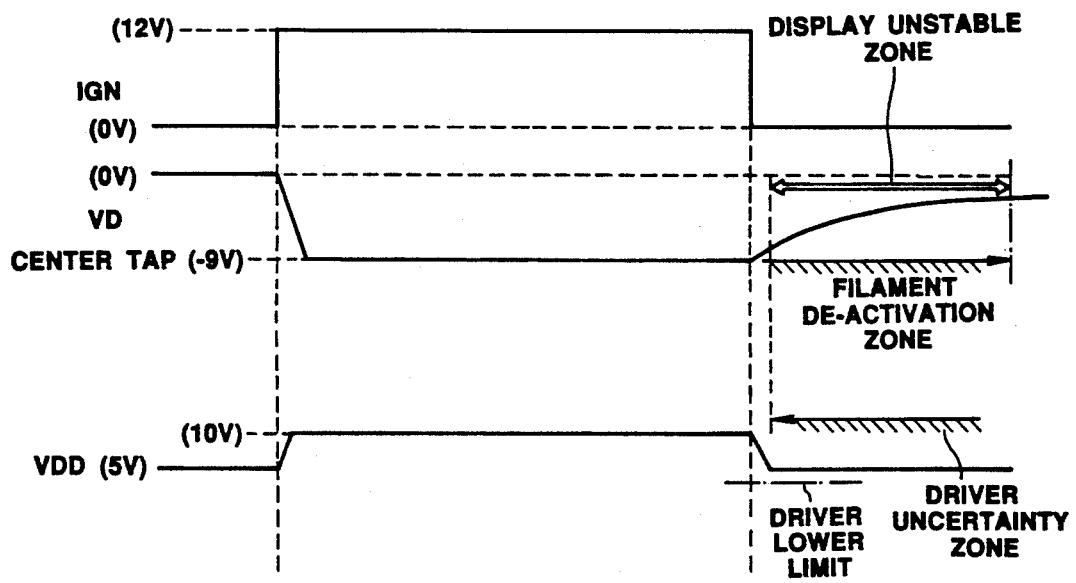

FIG. 32 is a timing chart which shows the operation of the instant embodiment. As the operation of the arrangement shown in FIG. 31 will be apparent from this chart no further disclosure will be given for brevity.

FOURTEENTH AND FIFTEENTH EMBODIMENTS

Figure 33:
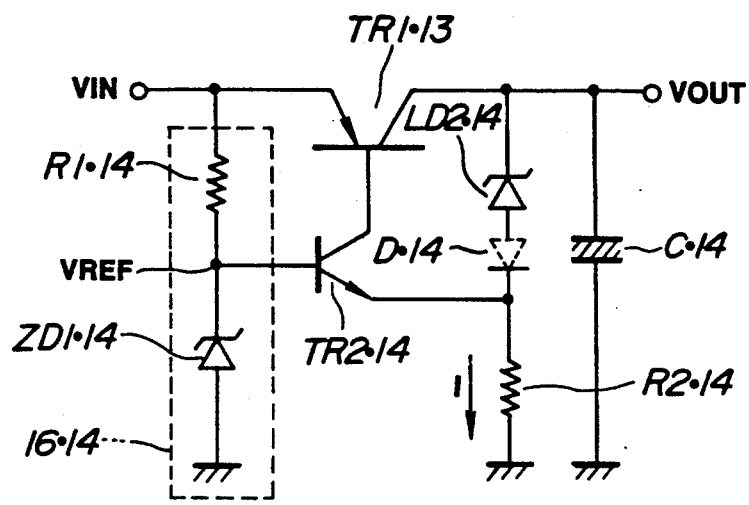
Figure 34:
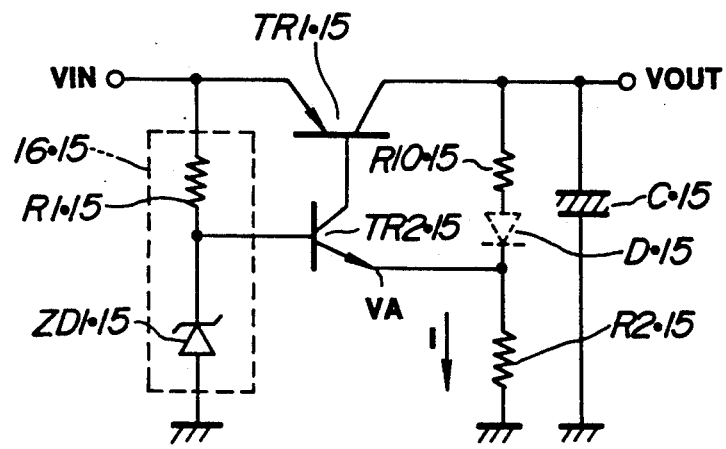

FIGS. 33 and 34 show fourteenth and fifteenth embodiments of the present invention. In the fourteenth embodiment, transistors TR1.14, TR2.14; resistors R1.14 and R2.14; Zener diodes ZD1.14; and Zd2.14; diode D.14; and capacitor C.14 are connected as shown. The node defined between R1.14 and ZD1.14 of the basic power supply circuit 16.14 develops a reference voltage Vref which is applied to the base of transistor TR2.14.

The operation of this arrangement is such that when Vref is applied to the base of transistor TR2.14 the voltage which appears on the emitter thereof is $VA = Vref + VBE$ where VBE denotes the voltage which develops across the base and the emitter of TR2.14.

In response to this, when $Vout > VA + Vz$ (where Vz is the breakdown voltage which of ZD2.14). Zener diodes ZD2.14 and transistor TR2.14 become conductive and the voltage Vout appearing on the output terminal is reduced.

On the other hand, when $Vout < VA + VZ$ then ZD2.14 becomes non-conductive and TR2.14 and TR1.14 are simultaneously rendered conductive. This results in the increase of the voltage Vout appearing on the output terminal. Under these conditions the current flow at the base of TR1.14 becomes VA/R (where R is the resistance of resistor R2.14.

The fifteenth embodiment is basically similar to the fourteenth one but features a slightly simplified construction. When the potential which is produced by the voltage dividing effect of R10.15 and R2.15 is greater than VA which appears on the emitter of transistor TR2.15 the latter mentioned element assumes a quasi non-conductive state, and vice versa. The effect of this arrangement is essentially similar to that of the previous one and as such no further disclosure is deemed necessary.

It will be appreciated that although the various embodiments have been disclosed essentially independently of one another, the manner which they can be combined and the merits which are derivable via the combination, will be apparent to those skilled in the art to which the instant invention pertains. Accordingly, no further disclosure concerning the same will be given.

What is claimed is:

1. A display arrangement for use in an automotive vehicle comprising:
vehicular operating parameter sensor means for sensing a magnitude of a vehicular operating parameter and for outputting a signal indicative thereof;
first and second display units;
display control means, responsive to said vehicular operating parameter sensor means, for generating signals which are supplied to said first and second display units and for inducing said first and second display units to selectively produce images;
illumination control means for controlling a degree of illumination of said images produced by said first and second display units, said illumination control means being arranged to be responsive to an input indicative of a level of external illumination in a manner to induce selective use of first and second illumination control schedules; and
noise attenuation means for attenuating the effect of electromagnetic noise on images produced by said second display unit, said noise attenuation means being interposed between said illumination control means and said second display unit and being included in a second of first and second serially connected interface circuits which provide an operative connection between said second display unit and said illumination control means and between said second display unit and said display control means, said first and second interface circuits being connected such that data is bussed therebetween.

2. A display arrangement for use in an automotive vehicle comprising:
vehicular operating parameter sensor means for sensing a magnitude of a vehicular operating parameter and for outputting a signal indicative thereof;
first and second display units;
display control means, responsive to said vehicular operating parameter sensor means, for generating signals which are supplied to said first and second display units and for inducing said first and second display units to selectively produce images;
illumination control means for controlling a degree of illumination of said images produced by said first and second display units, said illumination control means being arranged to be responsive to an input indicative of a level of external illumination in a manner to induce selective use of first and second illumination control schedules; and
noise attenuation means for attenuating the effect of electromagnetic noise on images produced by said second display unit, said noise attenuation means being interposed between said illumination control means and said second display unit and included in a second of first and second serially connected interface circuits which provide an operative connection between said second display unit and said illumination control means and between said second display unit and said display control means said first and second interface circuits being connected such that data is bussed therebetween, wherein said display control means includes
first and second data transmission circuits transmitting data to said first and second display units, respectively, said first and second data transmission circuits being operatively connected to said vehicular operating parameter sensing means such that a magnitude of a parameter sensed by said vehicular operating parameter sensor means is encoded before being supplied to said first and second data transmission circuits; and
first and second driver circuits operatively interposed between said first and second data transmission circuits and said first and second display units, respectively;
and wherein said illumination control means includes an illumination level control device which produces a required illumination indicative signal;
a third interface circuit receiving signals produced by said illumination control device; and
an illumination level control circuit, said illumination level control circuit being operatively connected to said first and second driver circuits.

3. A display arrangement for use in an automotive vehicle comprising:
first and second display units;
display control means for generating signals which are supplied to said first and second display units and for inducing said first and second display units to selectively produce images;
illumination control means for controlling a degree of illumination of images produced by said first and second display units, said illumination control means being arranged to be responsive to an input indicative of a level of external illumination in a manner to induce selective use of first and second illumination control schedules; and
noise attenuation means for attenuating the effect of noise on images produced by said second display unit; wherein said display control means includes
first and second data transmission circuits transmitting data to said first and second display units, respectively;
a parameter sensor, said parameter sensor being operatively connected to said data transmission circuits in a manner wherein the magnitude of a parameter sensed by said parameter sensor is encoded before being supplied to said first and second data transmission circuits; and
first and second driver circuits operatively interposed between said first and second data transmission circuits and said first and second display units, respectively;
and wherein said illumination control means includes a manually operable illumination level control device which produces a required illumination indicative signal;

a light control switch which is closed when an ambient illumination level is low;

a first interface circuit receiving signals produced by said manually operable illumination control device and said light control switch;

an illumination level control circuit, said illumination level control circuit being operatively connected to said first and second driver circuits, and wherein said noise attenuation means includes a second interface circuit operatively interposed between said second data transmission circuit and said second driver circuit, said second interface circuit being arranged to receive an illumination level control signal from said illumination level control circuit; and a third interface circuit, said third interface circuit being interposed between said second driver circuit and said second interface circuit and connected to said second interface circuit by a data bus, said third interface circuit including a filter which includes said noise attenuation means.

4. A display arrangement for use in an automotive vehicle comprising:

first and second display units;

display control means for generating signals which are supplied to said first and second display units and for inducing said first and second display units to selectively produce images;

illumination control means for controlling a degree of illumination of images produced by said first and second display units, said illumination control means being arranged to be responsive to an input indicative of a level of external illumination in a manner to induce selective use of first and second illumination control schedules; and noise attenuation means for attenuating the effect of noise on images produced by said second display unit; and wherein said display control means includes first and second data transmission circuits transmitting data to said first and second display units, respectively;

a parameter sensor, said parameter sensor being operatively connected to said data transmission circuits in a manner wherein the magnitude of a parameter sensed by said parameter sensor is encoded before being supplied to said first and second data transmission circuits; and first and second driver circuits operatively interposed between said first and second data transmission circuits and said first and second display units, respectively;

and wherein said illumination control means includes a manually operable illumination level control device which produces a required illumination indicative signal;

a light control switch which is closed when an ambient illumination level is low;

a first interface circuit receiving signals produced by said manually operable illumination control device and said light control switch; and an illumination level control circuit, said illumination level control circuit being operatively connected to said first and second driver circuits; said display arrangement further including a power supply switch, said power supply switch being closed when said vehicle is being operated, said power supply switch being operatively connected to said first interface; and a memory circuit, said memory circuit being included in said illumination control means and arranged to be responsive to said manually operable illumination level control device in a manner to store a count indicative of a currently selected level, said memory circuit being responsive to said power supply switch in a manner wherein when said power supply switch is moved from an open condition to a closed condition, said memory circuit resets counts indicative of illumination levels more intense than a predetermined optimal level, to a default value which corresponds to said predetermined optimal illumination level.

5. A display arrangement as claimed in claim 4 wherein said memory circuit is arranged in a manner wherein counts which are indicative of an illumination level less intense than said predetermined optimal level are maintained when said power supply switch is moved from an open condition to a closed condition.

6. A display arrangement as claimed in claim 4 wherein said manually operable illumination level control device comprises:

a variable resistor;

a knob which is operatively connected to said variable resistor and which can be rotated in a manner to change the resistance exhibited by said variable resistor; and an A/D converter, said A/D converter being operatively connected to said variable resistor in a manner to convert an analog output of said variable resistor into a digital signal.

7. A display arrangement as claimed in claim 6 further comprising:

a memory; and a wave generation circuit which receives a digital signal from said A/D converter and produces a PWM signal, said wave generation circuit being operatively connected to said memory and said A/D converter, said wave generation circuit being further responsive to said light control switch in a manner to select said first illumination control schedule when said light control switch is open and said second illumination control schedule when said light control switch is closed.

8. A display arrangement as claimed in claim 7 wherein said vehicle further includes a windshield and wherein an image produced by said second display unit is projected onto said windshield and wherein said display arrangement further comprises:

a light sensor, said light sensor being arranged to sense light which is approaching said windshield and which will pass through a location on said windshield where an image is projected and a location where a corresponding virtual image appears, said light sensor being operatively connected to said A/D converter in a manner wherein an output of said light sensor is converted into a digital signal;

a manually operable mode selection switch; and a correction circuit operatively interposed between said A/D converter and said wave generation circuit, said correction circuit being operatively connected to said manually operable mode selection switch and said light control switch, said correction circuit producing full-automatic, manual and semiautomatic modes of operation in response to signals from said mode selection switch, said correction circuit being constructed and arranged so as to adjust a level of illumination of images produced by said first and second display units in full response to said output of said light sensor when said full-automatic mode is selected, in partial response to said output of said light sensor and a setting of said manually operable illumination level control device when said semiautomatic mode is selected, and in response to a setting of only said manually operable illumination level control device when said manual mode is selected.

9. A display arrangement for use in an automotive vehicle comprising:

first and second display units;

display control means for generating signals which are supplied to said first and second display units and for inducing said first and second display units to selectively produce images;

illumination control means for controlling a degree of illumination of images produced by said first and second display units, said illumination control means being arranged to be responsive to an input indicative of a level of external illumination in a manner to induce selective use of first and second illumination control schedules; and noise attenuation means for attenuating the effect of noise on images produced by said second display unit; and wherein said display control means includes first and second data transmission circuits for transmitting data to said first and second display units, respectively;

a parameter sensor, said parameter sensor being operatively connected to said data transmission circuits in a manner wherein the magnitude of a parameter sensed by said parameter sensor is encoded before being supplied to said first and second data transmission circuits; and first and second driver circuits operatively interposed between said first and second data transmission circuits and said first and second display units, respectively;

and wherein said illumination control means includes a manually operable illumination level control device which produces a required illumination indicative signal;

a light control switch which is closed when an ambient illumination level is low;

a first interface circuit receiving signals produced by said manually operable illumination control device and said light control switch; and an illumination level control circuit, said illumination level control circuit being operatively connected to said first and second driver circuits; and wherein said manually operable illumination level control device includes first and second level control switches, said first level control switch being arranged to be closed when an increase in illumination of images produced by said first and second display units is desired and said second level control switch being arranged to be closed when reduction of illumination of images produced by said first and second display units is desired;

a source of clock pulses;

first and second counters, said first and second counters each having an up count terminal and a down count terminal;

a relay, said relay being responsive to said light control switch in a manner wherein when said light control switch is open said relay connects said first and second level control switches to said first counter and when said light control switch is closed, said relay connects said first and second level control switches to said second counter; and a first gate, said first gate being operatively interposed between said first and second level control switches, said source of clock pulses and said relay, said first gate being arranged to supply a train of pulses to said relay when one of said first and second level control switches is closed.

10. A display arrangement as claimed in claim 9 further comprising:

a power supply switch, said power supply switch being closed when said vehicle is being operated, said power supply switch being operatively connected to said first interface circuit;

a power on status detection circuit, said power on status detection circuit being connected to said power supply switch;

first and second count discrimination circuits, said first and second count discrimination circuits being connected between an output and a set terminal of said first and second counters, respectively, said first and second count discrimination circuits being arranged to compare counts having most recently appeared on output terminals of said first and second counters, respectively, with predetermined count values and to issue a signal in the event that most recent counts are greater than said predetermined count values;

a second gate, said second gate being arranged to be responsive to said power on status detection circuit and said first and second count discrimination circuits and interposed between said power on status detection circuit and said first and second count discrimination circuits and set terminals of said first and second counters, said second gate being arranged to output signals to said set terminals in the event that both said power on status detection circuit and said first and second count discrimination circuits simultaneously output signals.

11. A display arrangement comprising:

a head up display associated with a windshield, said head up display including means for generating an image and for projecting said image onto said windshield;

a light sensor, said light sensor being arranged to sense light which is approaching said windshield and which will pass through a location on said windshield where said image is projected and a location where a corresponding virtual image appears, said light sensor outputting a light indicative signal;

a manually operable level control unit to produce a signal indicative of a preferred illumination level; and a wave generation circuit, coupled to said head up display, which receives said light indicative signal from said light sensor and said signal indicative of said preferred illumination level and produces a PWM signal, said wave generation circuit including means for producing a semi-automatic mode wherein a basic level of illumination is set in response to said preferred illumination level and a level of illumination is automatically adjusted within predetermined limits with respect to said basic level in response to said light indicative signal.

12. A display arrangement as claimed in claim 11, further comprising:
a noise attenuation unit operatively interposed between said wave generation circuit and said head up display.

13. A display arrangement as claimed in claim 11, further comprising:
a light switch which has first and second states, said light switch assuming said second state when vehicle headlights are illuminated;
a memory which is operatively connected to said wave generation circuit and in which first and second illumination control schedules are stored, said first illumination control schedule for daylight usage and being read out in response to said light switch assuming said first state, said second illumination control schedule for night use and being read out when said light switch assumes said second state.

14. A display arrangement as claimed in claim 13, wherein a gain with which illumination level is increased with an increase in said preferred illumination level in accordance with said first illumination control schedule is less than with said second illumination control schedule.

15. A display arrangement as claimed in claim 13, wherein said memory records a level of illumination indicated by said signal indicative of said preferred illumination level and responds to a power supply switch such that when said power supply switch is moved from an open condition to a closed condition, said memory compares a recorded level with a default value and sets an illumination level to the lower of said recorded level and said default value.

16. A display arrangement comprising:
a head up display associated with a windshield, said head up display including means for generating an image and for projecting said image onto said windshield;
a manually operable level control to produce a signal indicative of a preferred illumination level;
a wave generation circuit, coupled to said head up display, which receives said signal indicative of said preferred illumination level and produces a PWM signal;
a memory which is operatively associated with said wave generation circuit, said memory recording a level of illumination indicated by said signal indicative of said preferred illumination level and regaining a recorded value when said head up display is not in use; and
means for comparing a recorded level with a default value and for setting an illumination level to the lower of said recorded level and said default value each time said head up display is started.

17. A display arrangement as claimed in claim 16, further comprising:
a noise attenuation unit operatively interposed between said wave generation circuit and said head up display.

18. A display arrangement comprising:
a head up display associated with a windshield, said head up display including means for generating an image and for projecting said image onto said windshield;
a light sensor, said light sensor being arranged to sense light which is approaching said windshield and which will pass through a location on said windshield where said image is projected and a location where a corresponding virtual image appears, said light sensor outputting a light indicative signal;
a manually operable level control unit to produce a signal indicative of a preferred illumination level; and
a wave generation circuit, coupled to said head up display, which receives said light indicative signal from said light sensor and said signal indicative of said preferred illumination level and produces a PWM signal, said wave generation circuit including means for producing a fully automatic mode wherein a basic level of illumination is set in response to said preferred illumination level and a level of illumination is fully corrected with respect to said basic level in response to said light indicative signal.

19. A display arrangement as claimed in claim 18, further comprising:
mode selection means for manually selecting said automatic mode and a semi-automatic mode wherein a level of illumination is automatically adjusted within predetermined limits with respect to said basic level in response to said light indicative signal.

* * * * *